(12) United States Patent
Snider et al.

(10) Patent No.: US 7,958,071 B2
(45) Date of Patent: Jun. 7, 2011

(54) COMPUTATIONAL NODES AND COMPUTATIONAL-NODE NETWORKS THAT INCLUDE DYNAMICAL-NANODEVICE CONNECTIONS

(75) Inventors: Gregory S. Snider, Mountain View, CA (US); Warren J. Robinett, Chapel Hill, SC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 11/788,447

(22) Filed: Apr. 19, 2007

(65) Prior Publication Data

US 2008/0258767 A1    Oct. 23, 2008

(51) Int. Cl.
*G06E 1/00* (2006.01)
(52) U.S. Cl. ............................................. 706/26
(58) Field of Classification Search ............. 706/26–28, 706/38, 44
See application file for complete search history.

(56) References Cited

U.S. PATENT DOCUMENTS

| | | | |
|---|---|---|---|
| 5,179,631 | A | 1/1993 | Guddanti et al. |
| 5,706,404 | A | 1/1998 | Colak |
| 6,889,216 | B2 | 5/2005 | Nugent |
| 2006/0266999 | A1 | 11/2006 | Snider et al. |
| 2007/0005532 | A1 | 1/2007 | Nugent |

OTHER PUBLICATIONS

Chua, L.O. et al. "Autonomous Cellular Neural Networks: A Unified Paradigm for Pattern Formation and Active Wave Propagation", IEEE Trans. on Circuits and Systems-I: Fundamental Theory and Applications, vol. 42, No. 10, Oct. 1995, pp. 559-577.*
Chua, L.O. "Nonlinear Circuit Foundations for Nanodevices, Part I: The Four-Element Torus", Proc. Of the IEEE, vol. 91, No. 11, Nov. 2003, pp. 1830-1859.*
Morie, T. et al. "A 1-D CMOS PWM Cellular Neural Network Circuit and Resistive-Fuse Network Operation", in: Ext. Abs. of Int. Conf. on Solid State Devices and Materials, the Japan Society of Applied Physics, 2001, pp. 90-91.*
Nakano, T. et al. "Coarse image region segmentation using resistive-fuse networks implemented in FPGA", Proc. The 7th World Multiconference on Systemics, Cybernetics and Informatics (SCI 2003), vol. 4, 2003, pp. 186-191.*

* cited by examiner

*Primary Examiner* — Donald Sparks
*Assistant Examiner* — Benjamin Buss

(57) ABSTRACT

Embodiments of the present invention are employ dynamical, nanoscale devices, including memristive connections between nanowires, for constructing parallel, distributed, dynamical computational networks and systems, including perceptron networks and neural networks. In many embodiments of the present invention, neuron-like computational devices are constructed from silicon-based microscale and/or submicroscale components, and interconnected with one another by dynamical interconnections comprising nanowires and memristive connections between nanowires. In many massively parallel, distributed, dynamical computing systems, including the human brain, there may be a far greater number of interconnections than neuron-like computational nodes. Use of dynamical nanoscale devices for these connections results in enormous design, space, energy, and computational efficiencies.

19 Claims, 34 Drawing Sheets

F = amount of synaptic strengthening

--Prior Art--

$$\frac{dw}{dt} = S_{si}\left(-\frac{1}{\tau_s}w + k\,S_{so}\right) = \frac{1}{\tau_s}(w\,S_i) + k\,S_{si}\,S_{so}$$

Table 1: Experimental network parameters

Edge parameters

| | | |
|---|---|---|
| $w_{min}$ | 0.05 | minimum edge weight |
| $w_{max}$ | 1.0 | maximum edge weight |
| $R$ | 0.0125 | learning rate |
| $\Delta w(f+)$ | $-0.075\,R$ | $\Delta$weight, forward spike positive pulse |
| $\Delta w(f-)$ | $0.075\,R$ | $\Delta$weight, forward spike negative pulse only |
| $\Delta w(b+)$ | $0.075\,R$ | $\Delta$weight, back spike positive pulse only |
| $\Delta w(b-)$ | $-0.15\,R$ | $\Delta$weight, back spike negative pulse |
| $\Delta w(f\text{-}b+)$ | $1.5\,R$ | $\Delta$weight, forward negative pulse + back positive pulse |

Node parameters

| | | |
|---|---|---|
| $\tau_d$ | 6 cycles | integrator decay time constant |
| *threshold* | 18 | integrator spiking threshold |

COMPUTATIONAL NODES AND COMPUTATIONAL-NODE NETWORKS THAT INCLUDE DYNAMICAL-NANODEVICE CONNECTIONS

TECHNICAL FIELD

The present invention is related to the design and implementation of various types of connection-based, parallel, dynamical, distributed processing networks and, in particular, to the design and implementation of connection-based, parallel, distributed, dynamical networks the employ dynamical nanodevices as connections between computational nodes.

BACKGROUND OF THE INVENTION

Early in the history of computing, computer scientists became interested in biological computing structures, including the human brain. Although sequential-instruction-processing engines have technologically evolved with extreme rapidity during the past 50 years, with enormous increases in processor speeds and component densities, and these advancements have been accompanied by even greater increases in the capacities and access speeds of mass-storage devices and random-access memories, and although modern computer systems based on sequential-instruction-processing engines provide enormous utility and have spawned entire new industries unimagined prior to the development of digital computers, many seemingly straightforward problems can still not be effectively addressed by even the largest and highest-speed distributed computer systems and networks. One trivial example is the interpretation of photographs and video images. A human can, often in a fraction of a second, glance at a photograph and accurately interpret objects, interrelationships between objects, and the spatial organization of objects represented by the two-dimensional photograph, while such interpretation of photographic images is beyond the ability of the largest computer systems running the most clever algorithms.

Extensive research efforts have been expended in investigating the structure and function of the human brain. Many of the fundamental computational entities in such biological systems have been identified and characterized physiologically, at microscale dimensions as well as at the molecular level. For example, the neuron, a type of cell responsible for signal processing and signal transmission within the human brain, is relatively well understood and well characterized, although much yet remains to be learned. This understanding of neuron function has inspired a number of fields in computer science, including neural-network and perceptron-network subfields of artificial intelligence. Many successful software implementations of neural networks have been developed to address a variety of different applications, including pattern recognition, diagnosis of the causes of complex phenomena, various types of signal processing and signal denoising, and other applications. However, the human brain is massively parallel from a structural standpoint, and while such parallelism can be simulated by software implementations and neural networks, the simulations are generally processor-cycle bound, because the simulations necessarily run on one or a relatively small number of sequential instruction-processing engines, rather make use of physical parallelism within the computing system. Thus, neural networks may provide tolerance to noise, learning capabilities, and other desirable characteristics, but do not currently provide the extremely fast and high-bandwidth computing capabilities of massively parallel biological computational structures.

In order to achieve the extremely fast and high-bandwidth computing capabilities of biological computational structures in physical, manufactured devices, computational tasks need to be carried out on massively parallel and interconnected networks of computational nodes. Many different approaches for implementing physical neural networks have been proposed, but implementations have so far have fallen fall short of the speed, parallelism, and computational capacity of even relatively simple biological structures. In addition, design and manufacture of massively parallel hardware is fraught with any number of different practical problems, including reliable manufacture of large numbers of dynamical connections, size and power constraints, heat dissipation, reliability, flexibility, including programmability, and many other such considerations. However, unlike many theoretical problems, for which it is unclear whether or not solutions can be found, the fact that computational biological structures, including the human brain, exist, and perform spectacular feats of computation on a regular basis would suggest that the goal of designing and constructing computational devices with similar computational capacities and efficiencies is quite possible. Computer scientists, hardware designers, researchers focused on artificial intelligence, biological intelligence, and a wide variety of different fields within computer science and information sciences, have all recognized the need for developing new physical, hardware devices suitable for the types of massively parallel, distributed, dynamical processing that occurs within the human brain and other computational biological structures.

SUMMARY OF THE INVENTION

Embodiments of the present invention are employ dynamical, nanoscale devices, including memristive connections between nanowires, for constructing parallel, distributed, dynamical computational networks and systems, including perceptron networks and neural networks. In many embodiments of the present invention, neuron-like computational devices are constructed from silicon-based microscale and/or submicroscale components, and interconnected with one another by dynamical interconnections comprising nanowires and memristive connections between nanowires. In many massively parallel, distributed, dynamical computing systems, including the human brain, there may be a far greater number of interconnections than neuron-like computational nodes. Use of dynamical nanoscale devices for these connections results in enormous design, space, energy, and computational efficiencies.

BRIEF DESCRIPTION OF THE DRAWINGS

FIG. 33 shows a table containing default network parameters for an embodiment of the present invention.

DETAILED DESCRIPTION OF THE INVENTION

Embodiments of the present invention provide physical implementations of parallel, distributed, dynamical networks of computational nodes, including perceptron networks and neural networks. In a first subsection, below, biological neurons are reviewed, since the neuron has provided the model and goal for many efforts in artificial intelligence and parallel hardware design. In a next subsection, artificial neural networks and perceptron networks are discussed, in overview. In a third subsection, the basic neuron-like computational node that represents one embodiment of the present invention is discussed. In a fourth subsection, the architecture of various parallel, distributed, dynamical computational systems based on the neuron-like computational node of the present invention and that represent additional embodiments of the present invention are discussed. Finally, in a fifth subsection, initial experimental results are provided.

Biological Neurons

Neurons are a type of cell found in the brains of animals. Neurons are thought to be one of, if not the, fundamental biological computational entity. It is estimated that the human brain contains on the order of 100 billion ($10^{11}$) neurons and on the order of 100 trillion ($10^{14}$) interconnections between neurons. The massive number of interconnections between neurons in the human brain is thought to be directly correlated with the massively parallel nature of biological computing.

Figure 1:
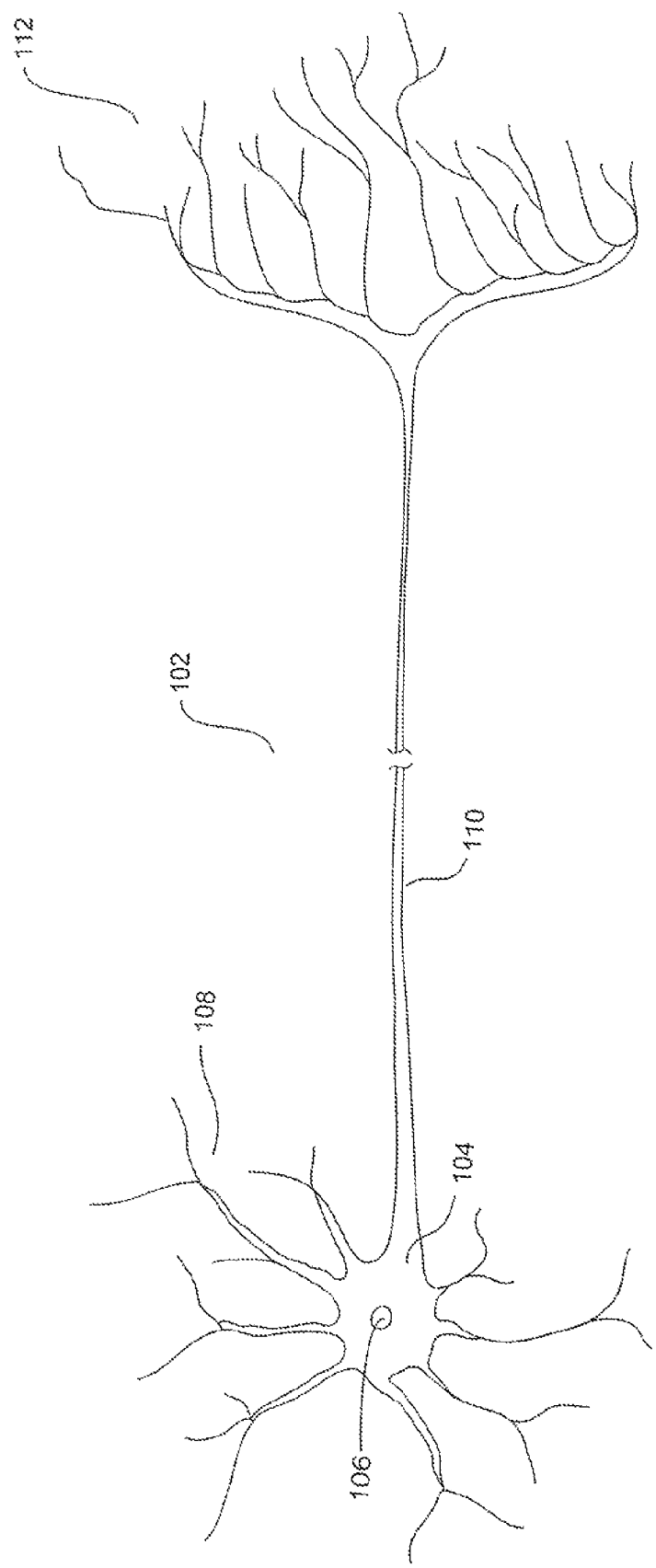
FIG. 1 shows a generalized and stylized illustration of a neuron.

Each neuron is a single cell. FIG. 1 shows a generalized and stylized illustration of a neuron. The neuron 102 includes a cell body 104 containing the cell nucleus 106 and various organelles, including mitochondria, a number of branching dendrites, such as dendrite 108, emanating from the cell body 104, and generally one very long axon 110 that terminates in many branching extensions 112. In general, the dendrites provide an enlarged neuron-surface area for receiving signals from other neurons, while the axon serves to transmit signals from the neuron to other neurons. The terminal branches of the axon 112 interface with the dendrites, and less frequently with the cell bodies, of other neurons. A single neuron may receive as many as 100,000 different signal inputs. Similarly, a neuron may transmit signals to tens, hundreds, or even thousands of downstream neurons. Neurons vary tremendously, within a given individual, with respect to the number of, and degree of branching of, dendrites and terminal axon extensions as well as with respect to volume and length. For example, axons range in length from significantly less than one millimeter to over one meter. This flexibility in axon length and connectivity allow for hierarchical cascades of signal paths and extremely complex connection-based organizations of signaling paths and cascades within the brain.

Figure 2:
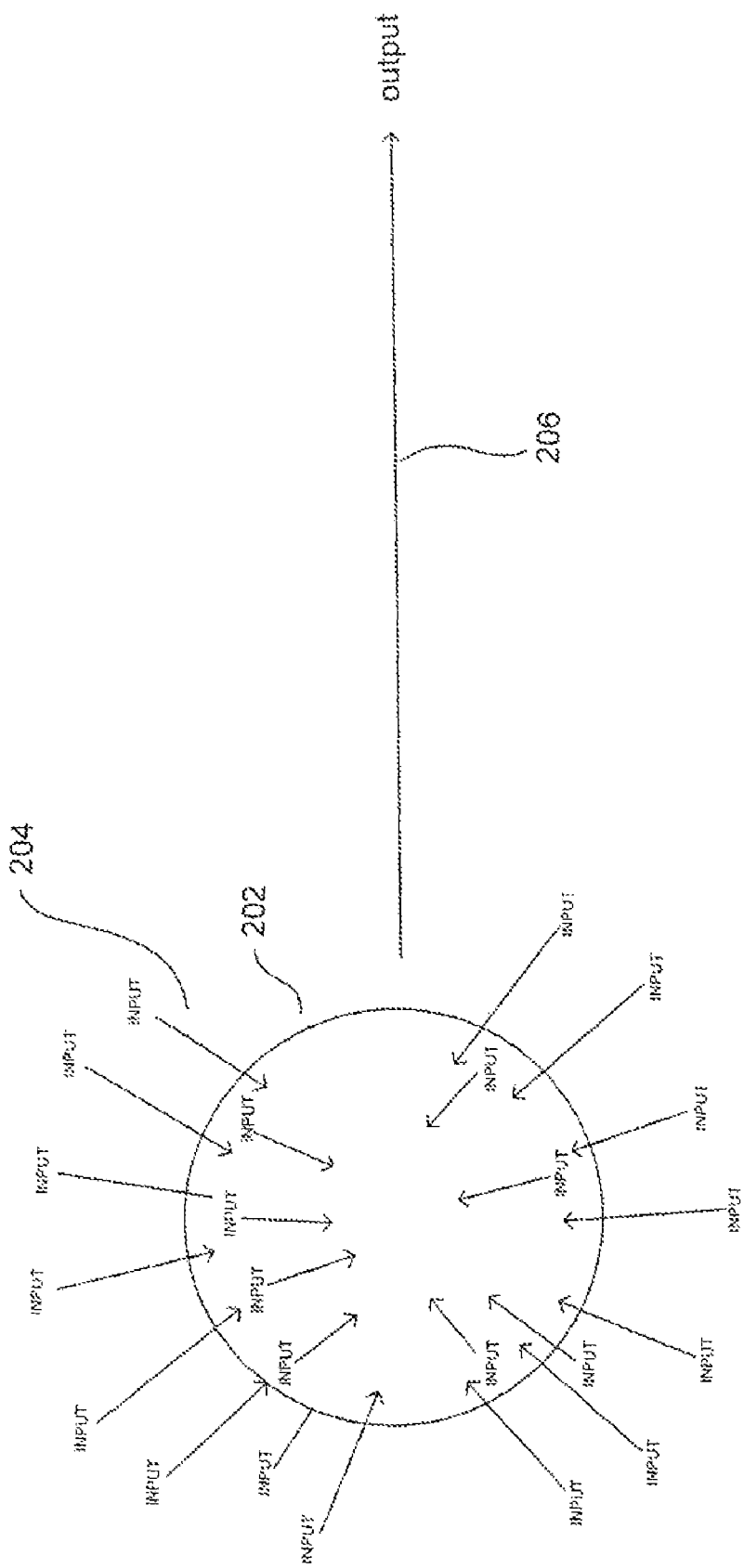
FIG. 2 shows a more abstract representation of a neuron.

FIG. 2 shows a more abstract representation of a neuron. A neuron can, in general, be thought of as a node 202 that receives input signals from multiple inputs, such as input 204, and depending on the temporal and spatial characteristics of the inputs, responds to input stimuli greater than a threshold intensity by firing an output signal 206. In other words, the neuron can be thought of as a very complex input-signal integrator combined with a thresholder and a signal-generation and signal-output mechanism. When the signal integrator accumulates a sufficient number of input signals over a bounded period of time and within a sufficiently small area of the node surface, the neuron responds by firing an output signal.

As mentioned above, input signals received by a given neuron are generated by output signals of other neurons connected to the given neuron by synapse junctions between the other neurons' terminal axon branches and the given neuron's dendrites. These synapses, or connections, between neurons have dynamically adjusted connection strengths, or weights. The adjustment of the connection strengths, or weights, is thought to significantly contribute to both learning and memory, and represents a significant portion of parallel computation within the brain.

Figure 3:
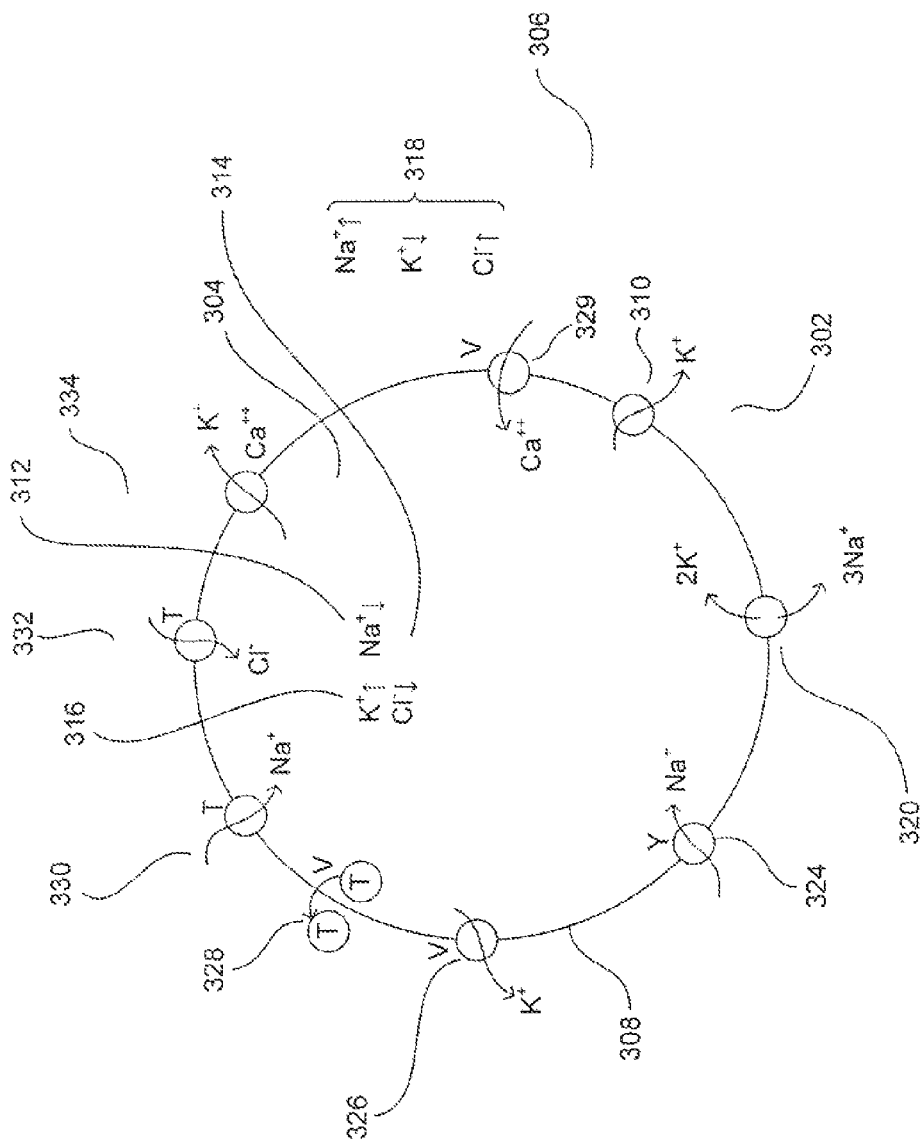
FIG. 3 is an abstract representation of a neuron cell, showing the different types of electrochemical gradients and channels in the neuron's outer membrane that control, and respond, to electrochemical gradients and signals and that are used to trigger neuron output signal firing.

Neuron functionalities are derived from, and depend on, complex electrochemical gradients and ion channels. FIG. 3 is an abstract representation of a neuron cell, showing the different types of electrochemical gradients and channels in the neuron's outer membrane that control, and respond, to electrochemical gradients and signals and that are used to trigger neuron output signal firing. In FIG. 3, the neuron is represented as a spherical, membrane-enclosed cell 302, the contents of which 304 are separated from the external environment 306 by a double-walled, hydrophobic membrane 308 that includes various types of channels, such as channel 310. The various types of channels provide for controlled chemical communication between the interior of the neuron and the external environment.

The channels primarily responsible for neuron characteristics are highly selective ion channels that allow for transport of particular inorganic ions from the external environment into the neuron and/or from the interior of the neuron to the external environment. Particularly important inorganic ions include sodium, $Na^+$, potassium, $K^+$, calcium, $Ca^{2+}$, and chlorine, $Cl^-$, ions. The ion channels are generally not continuously open, but are selectively opened and closed in response to various types of stimuli. Voltage-gated channels open and close depending on the voltage, or electrical field, across the neuron membrane. Other channels are selectively opened and closed by mechanical stress, and still other types of channels open and close in response to binding and release of ligands, generally small-molecule organic compounds, including neurotransmitters. Ion-channel behavior and responses may additionally be controlled and modified by the addition and deletion of certain functional groups to and from ion-channel proteins, carried out by various enzymes, including kinases and phosphatases, that are, in turn, controlled by various types of chemical signal cascades.

In general, in a resting, or non-firing state, the neuron interior has a relatively low concentration of sodium ions 312, a correspondingly low concentration of chlorine ions 314, and a relatively high concentration of potassium ions 316 with respect to the concentrations of these ions in the external environment 318. In the resting state, there is a significant 40-50 mV electrochemical gradient across the neuron membrane, with the interior of the membrane electrically negative with respect to the exterior environment. The electrochemical gradient is primarily generated by an active $Na^+$—$K^+$ pumping channel 320 which uses chemical energy, in the form of adenosine triphosphate, to continuously exchange three sodium ions expelled the interior of the neuron to the external environment for every two potassium ions imported from the external environment into the interior of the neuron. The neuron also contains passive $K^+$ leak channels 310 that allow potassium ions to leak back to the external environment from the interior of the neuron. This allows the potassium ions to come to an equilibrium with respect to ion-concentration gradient and the electrical gradient.

Neuron firing, or spiking, is triggered by a local depolarization of the neuron membrane. In other words, collapse of the normally negative electrochemical gradient across a membrane results in triggering of an output signal. A wave-like, global depolarization of the neuron membrane that represents neuron firing is facilitated by voltage-gated sodium channels 324 that allow sodium ions to enter the interior of the neuron down the electrochemical gradient previously established by the $Na^+$—$K^+$ pump channel 320. Neuron firing represents a short pulse of activity, following which the neuron returns to a pre-firing-like state, in which the normal, negative electrochemical gradient across the neuron membrane is reestablished. Voltage-gated potassium channels 326 open in response to membrane depolarization to allow an efflux of potassium ions, down the chemical potassium-ion gradient, in order to facilitate reestablishment of an electrochemical gradient across the neuron membrane following firing. The voltage-gated potassium channels 324, opened by local depolarization of the neuron membrane, are unstable, in the open state, and relatively quickly move to an inactivated state to allow the negative membrane potential to be reestablished, both by operation of the voltage-gated potassium channel 326 and the $Na^+$—$K^+$ channel/pump 320.

Neuron-membrane depolarization begins at a small, local region of the neuron cell membrane and sweeps, in a wave-like fashion, across the neuron cell, including down the axon to the axon terminal branches. Depolarization at the axon terminal branches triggers voltage-gated neurotransmitter release by exocytosis 328. Release of neurotransmitters by axon terminal branches into synaptic regions between the axon terminal branches of the firing neuron, referred to as the "pre-synaptic neuron," and dendrites of the signal-receiving neurons, each referred to as a "post-synaptic neuron," results in binding of the released neurotransmitter by receptors on dendrites of post-synaptic cells that results in transmission of the signal from the pre-synaptic neuron to the post-synaptic neurons. In the post-synaptic neurons, binding of transmitters to neurotransmitter-gated ion channels 330 and 332 results in excitatory input signals and inhibitory input signals, respectively. Neurotransmitter-gated ion channels that import sodium ions into the neuron 330 contribute to local depolarization of the neuron membrane adjacent to the synapse region, and thus provide an excitatory signal. By contrast, neurotransmitter-activated chlorine-ion channels 332 result in import of negatively charged chlorine ions into the neuron cell, resulting in restoring or strengthening the normal, resting negative voltage gradient across the membrane, and thus inhibit localized membrane depolarization and provide an inhibitory signal. Neurotransmitter release is also facilitated by voltage-gated calcium ion channels 329 that allow calcium influx into the neuron.

A $Ca^{2+}$ activated potassium channel 334 serves to decrease the depolarizability of the membrane following a high frequency of membrane depolarization and signal firing that results in build up of calcium ions within the neuron. A neuron that has been continuously stimulated for a prolonged period therefore becomes less responsive to the stimulus. Early, potassium-ion channels serve to reduce neuron firing levels at stimulation levels close to the threshold stimulation required for neuron firing. This prevents an all-or-nothing type of neuron response about the threshold stimulation region, instead providing a range of frequencies of neuron firings that correspond to a range of simulations of the neuron. The amplitude of neuron firing is generally constant, with output-signal strength reflecting in the frequency of neuron firing Another interesting feature of the neuron is long-term potentiation. When a pre-synaptic cells fires at a time when the post-synaptic membrane is strongly depolarized, the post-synaptic cell may become more responsive to subsequent signals from the pre-synaptic neuron. In other words, when pre-synaptic and post-synaptic neuron firings occur close in time, the strength, or weighting, of the interconnection may increase.

Figure 4:
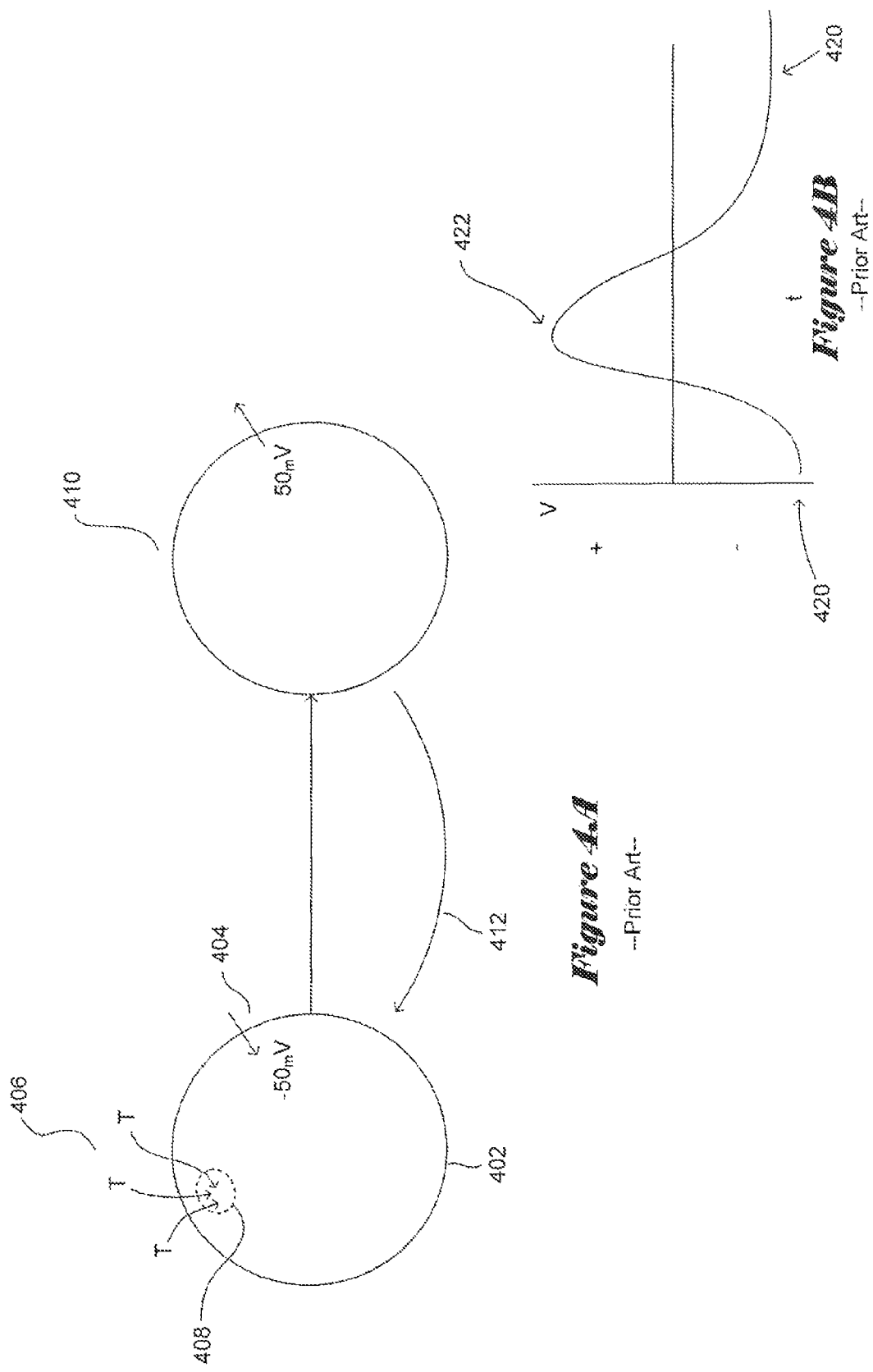
FIGS. 4A-B illustrate neuron firing.
Figure 5:
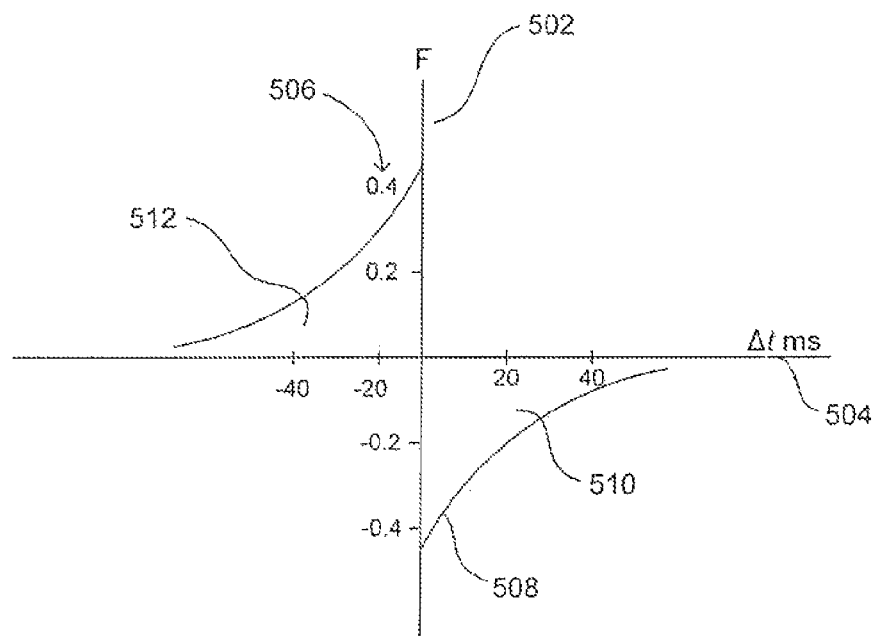
FIG. 5 illustrates a model for the dynamic synapse-strength phenomenon.

FIGS. 4A-B illustrate neuron firing. In FIG. 4A, the resting-state neuron 402 exhibits a negative voltage gradient across a membrane 404. As the resting neuron receives neurotransmitter-mediated signal input 406, a small region 408 of the neuron membrane may receive sufficient access of stimulatory signal input over inhibitory signal input to depolarize the small region of the neuron membrane 408. This local depolarization activates the voltage-gated sodium channels to generate a wave-like global depolarization that spreads across the neuron membrane and down the axon, temporarily reversing the voltage gradient across the neuron membrane as sodium ions enter the neuron along the sodium-ion-concentration gradient. The reversal of the voltage gradient places the neuron into a firing, or spiking state, in which, as discussed above, terminal branches of the axon release neurotransmitter signals into synapses to signal post-synaptic neurons. The voltage-gated sodium channels quickly become inactivated, voltage-gated potassium channels open, and the resting-state negative voltage gradient is quickly restored 412. FIG. 4B shows the voltage gradient reversal at the point on the neuron membrane during a spike or a firing. In general, the voltage gradient is negative 420, but temporarily reverses 422 during the wave-like membrane depolarization that represents neuron firing or spiking and propagation of the output signal down the axon to the terminal braches of the axon FIG. 5 illustrates a model for the dynamic synapse-strength phenomenon. FIG. 5 is a plot of synapse strengthening F, plotted with respect to the vertical axis 502, versus the time difference between pre-synaptic and post-synaptic spiking, plotted as Δt along the horizontal axis 504. When the pre-synaptic neuron fires close in time, but prior to, firing of the post-synaptic neuron, the amount of synapse strengthening is relatively high, represented by the steeply increasing portion of the plotted curve 506 to the left of the vertical axis. This portion of the plot of F corresponds to Hebbian learning, in which correlations in the firing of post-synaptic and pre-synaptic neurons lead to synapse strengthening. By contrast, when the pre-synaptic neuron fires just after firing of the post-synaptic neuron, then the synaptic strength is weakened, as represented by the steeply upward curving portion 508 of the plotted curve to the right of the vertical axis. When firing of the pre-synaptic and post-synaptic neurons is not correlated in time, or, in other words, Δt is large in magnitude, the strength of the synapse is not greatly affected, as represented by portions of the plotted curve that approach the horizontal axis at increasing distance from the origin. The synapse weakening response to pre-synaptic and post-synaptic neuron-firing correlations, represented by the area above the right-hand portion of the curve 510, needs to be greater than the synapse strengthening due to correlation between pre-synaptic and post-synaptic neuron firing, represented by the area under the left-hand portion of the plotted curve 512, in order for a system based on synapse strength to be stable, over time. Otherwise, synapse strength would tend towards maximum strength, over time.

In summary, neurons serve as somewhat leaky input-signal integrators combined with a thresholding function and an output-signal generation function. A neuron fires with increasing frequency as excitatory stimulation of the neuron increases, although, over time, the neuron response to constant high stimulus decreases. Synapses, or junctions, between neurons may be strengthened or weakened by correlations in pre-synaptic and post-synaptic neuron firings. In addition, and synapse strength and neuron stimulation both decay, over time, without reinforcing stimulus. Neurons provide a fundamental computational unit for massively parallel neuronal networks within biological organisms as a result of the extremely high density of connections between neurons supported by the highly branched dendrites and axon terminus branches, as well as by the length of axons.

Neural Networks and Perceptron Networks

Figure 6:
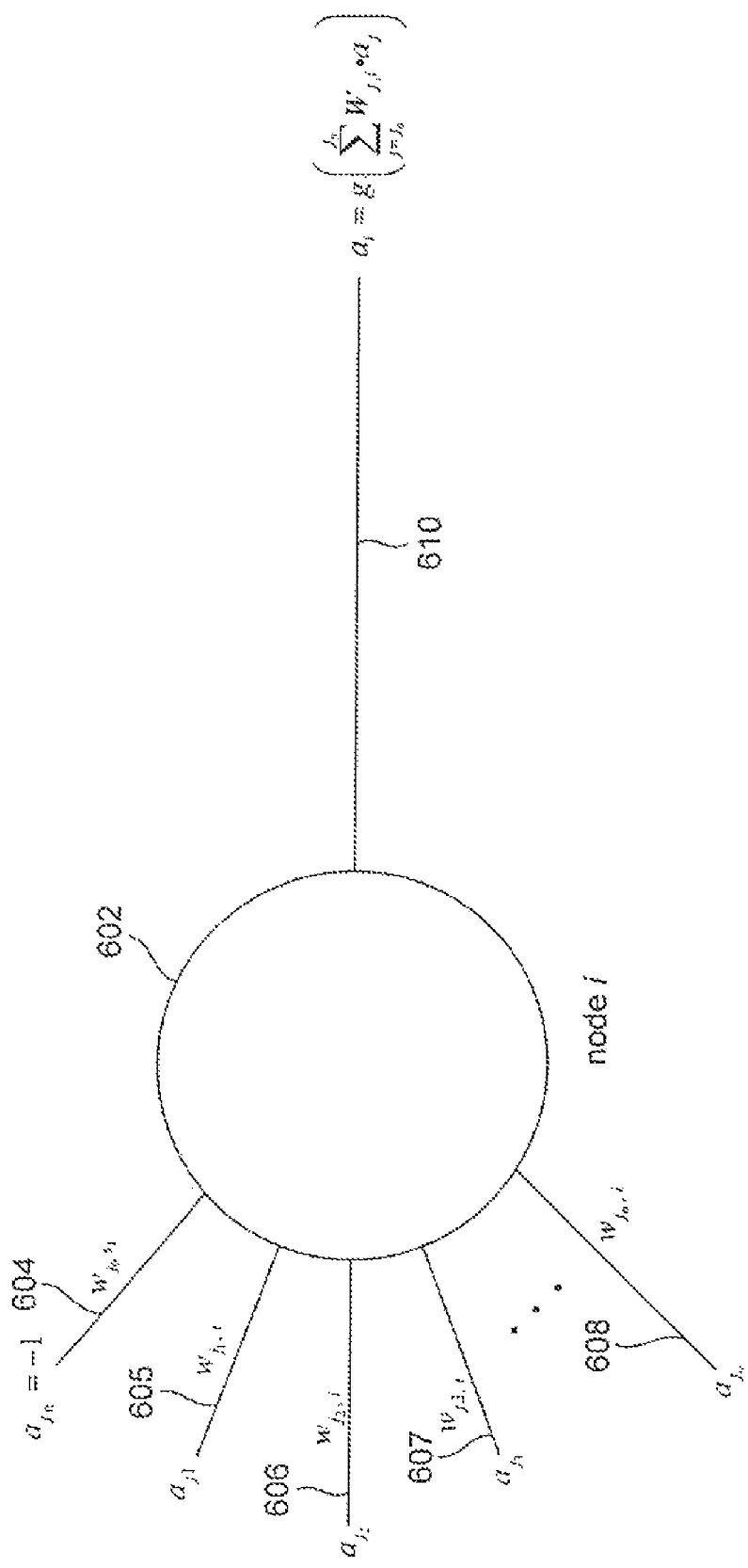
FIG. 6 shows a typical neural-network node.
Figure 7A:
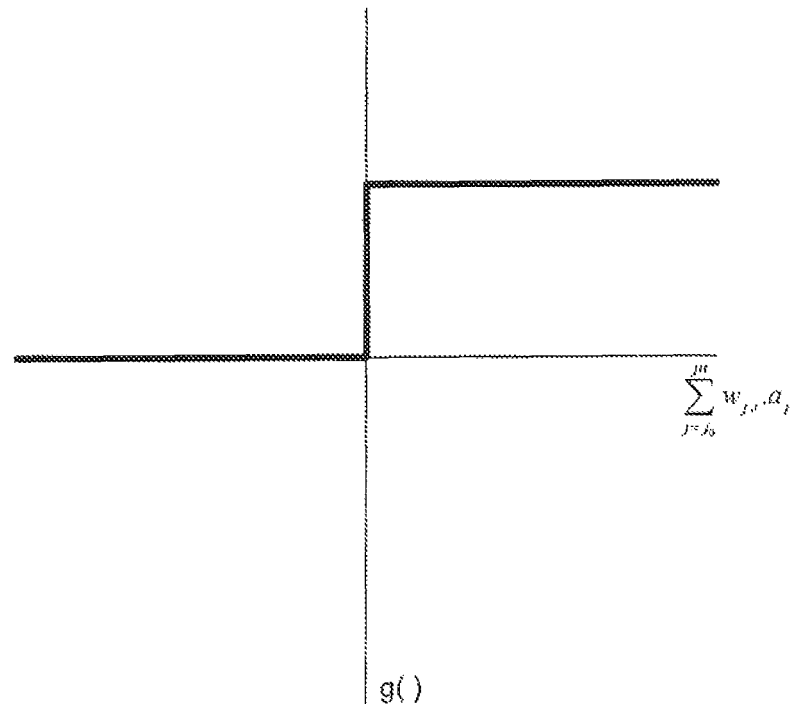
FIGS. 7A-7B illustrate two different examples of activation functions.
Figure 7B:
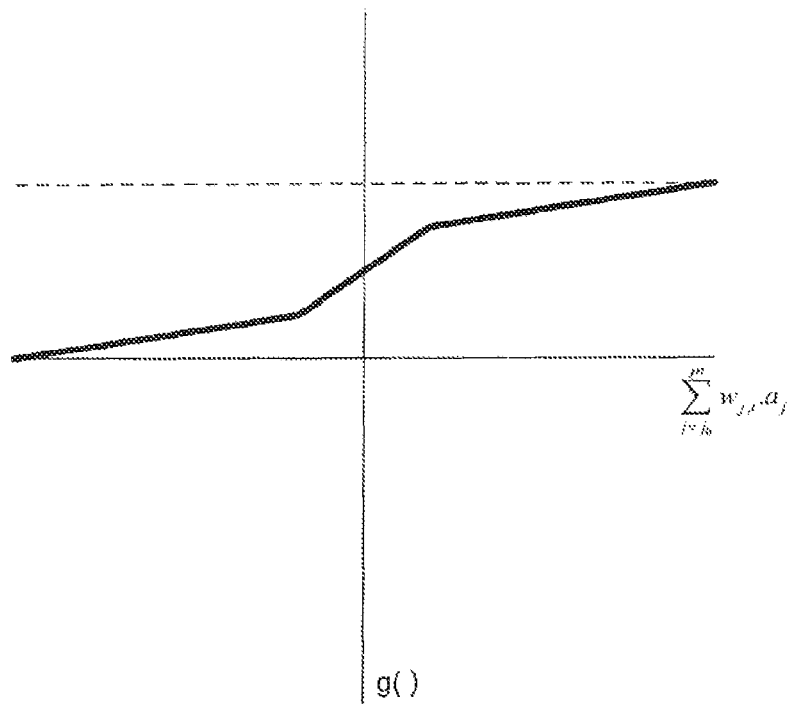

Neural networks, considered to be a field of artificial intelligence, originally motivated by attempts to simulate and harness biological signal-processing and computation, have proven sufficiently effective and useful that researchers and developers are currently attempting to build neural networks directly in hardware as well as developing specialized hardware platforms for facilitating software implementations of neural networks. Neural networks are essentially networks of computational interconnected nodes. FIG. 6 shows a typical neural-network node. It is not surprising that a neural network node is reminiscent of the model of the neuron shown in FIG. 2. A neural network node 602 receives inputs from a number n of directed links 605-608 as well as a special link $j_0$, and produces an output signal on an output link 610 that may branch, just as an axon branches, to transmit signals to multiple different downstream nodes. The directed input links 605-608 are output signals, or branch from output signals, of upstream nodes in the neural network, or, in the case of first-level nodes, are derived from some type of input to the neural network. The upstream nodes are each associated with an activation, which, in certain implementations, ranges from 0 to 1. Each input link is associated with a weight. Thus, the neural-network node i shown in FIG. 6 receives n inputs $j_1$, $j_2$, ..., $j_n$ from n upstream neural-network nodes having activations $a_{j_1}$, $a_{j_2}$, ..., $a_{j_n}$, with each input $j_1, j_2, \ldots j_n$ associated with current weight $w_{j_1,i}, w_{j_2,i}, \ldots, w_{j_n,i}$. In other words, the activation is a property of nodes, and the weights are a property of links between nodes. The neural network node i computes an activity $a_i$ from received, weighted input signals, and outputs as signal corresponding to the computed activity $a_i$ on the output signal line 610. As shown in FIG. 6:

$$a_i = g\left(\sum_{j=j_0}^{jn} w_{j,i} \cdot a_j\right)$$

where g( ) is a non-linear activation function. FIGS. 7A-7B illustrate two different examples of activation functions. The special input signal line $j_0$ represents an internal bias with a fixed activation $a_{j_0}=-1$. The weight $w_{j_0,i}$ associated with this internal bias is used to set the threshold for the node. When the sum of the weighted activations input from the actual input signal lines $j_1, j_2, \ldots j_n$ exceeds the bias weight of $w_{j_0,i}$, then the neuron is active. The first activation function g( ) shown in FIG. 7A represent a hard threshold, while the second activation function g( ) shown in FIG. 7B provides a soft threshold.

Figure 8:
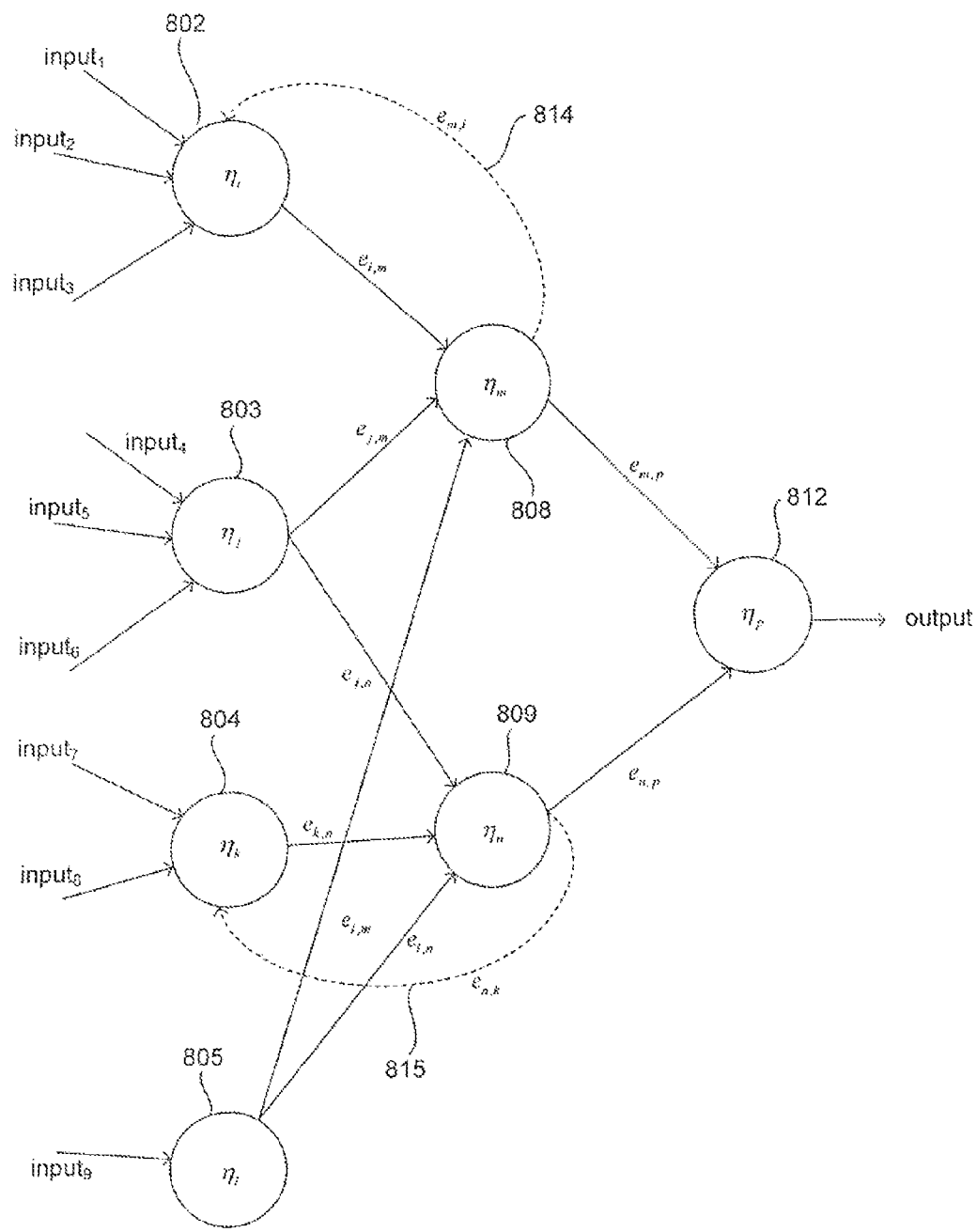
FIG. 8 shows a simple, three-level neural network.

FIG. 8 shows a simple, three-level neural network. The neural network includes four input nodes 802-805, two intermediate nodes 808-809, and a highest-level, output node 812. The input nodes 802-805 each receive one or more inputs to the neural network and each produce output signals that are directed through internal connections, or edges, to one or more of the intermediate nodes 808 and 809. In turn, the intermediate nodes produce output signals to edges connecting the intermediate nodes to the output node 812. A neural network in which signals are directed in only one direction along edges, from input nodes towards output nodes, is referred to as a "feed-forward network," while neural networks that include feedback edges, such as edges 814-815 in FIG. 8, that allow signals to propagate from higher-level nodes back to lower-level nodes, is referred to as a "recurrent network." Multi-layer neural networks can be used to represent general non-linear functions of arbitrary dimensionality and complexity, assuming the ability to include a corresponding arbitrary number nodes in the neural network.

Figure 9:
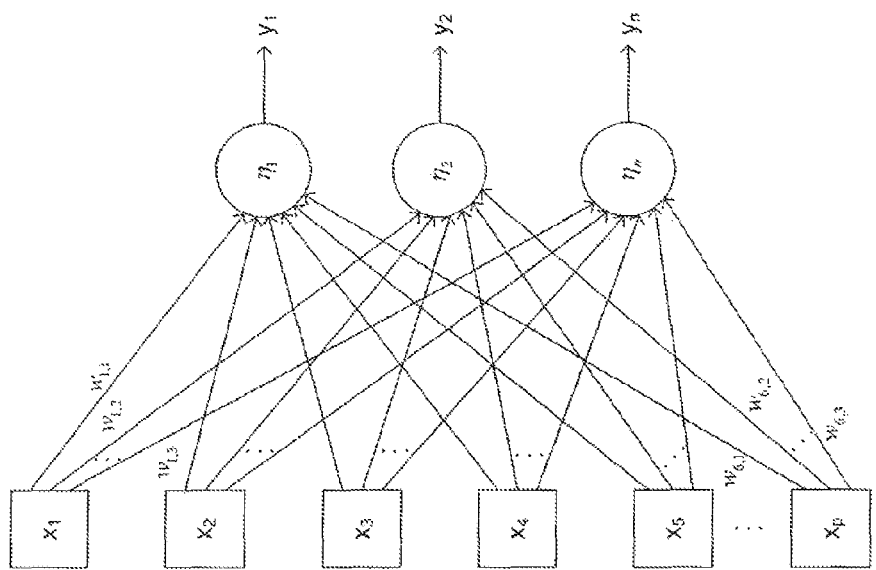
FIG. 9 illustrates a special type of single-node-layer neural network referred to as a "perceptron network."

FIG. 9 illustrates a special type of single-node-layer neural network referred to as a "perceptron network." A perceptron network is a neural network with all inputs connected directly to output nodes. Perceptron networks are used for various pattern-recognition tasks. However, perceptron networks can represent only linearly separable functions.

Figure 10:
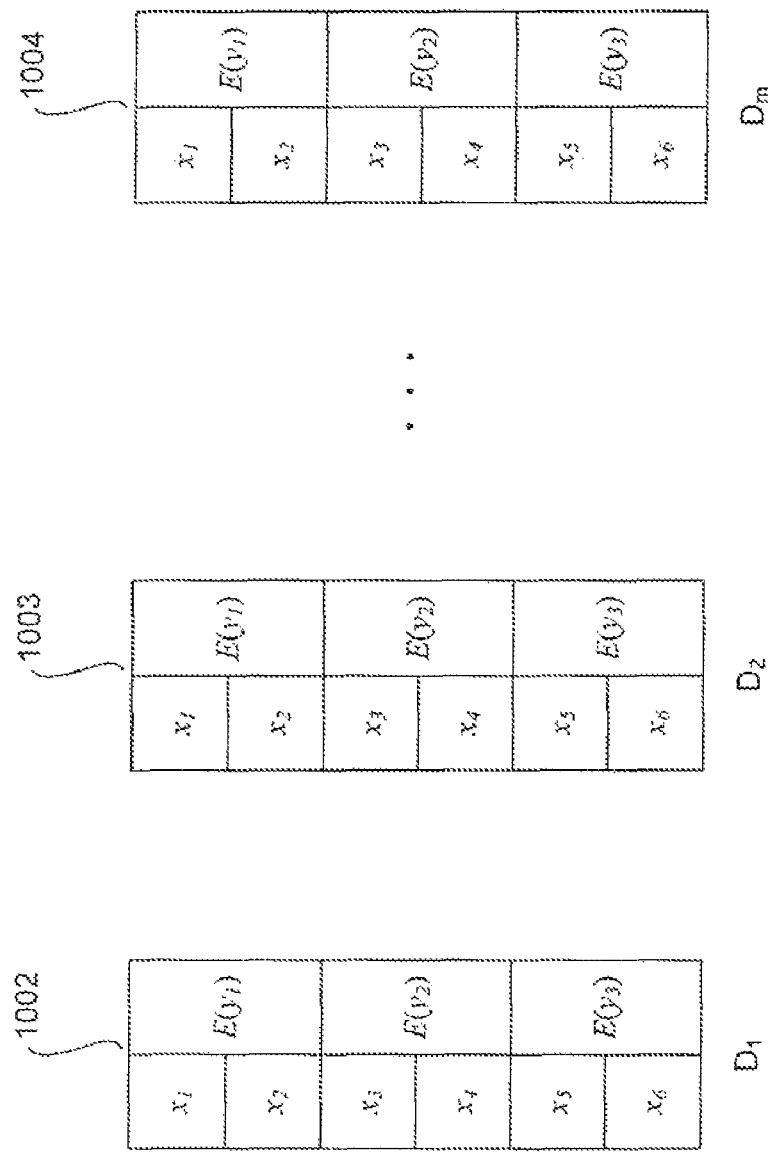
FIG. 10 shows training data for the perceptron network shown in FIG. 9.

In general, neural networks are first trained, by presenting the neural networks with sample input values associated with known, expected outputs. Weights associated with the edges of the neural network are adjusted during a training session so that, at the end of the training session, the neural network produces outputs as close as possible to the expected outputs for each of the sample input data. For example, FIG. 10 shows training data for the perceptron network shown in FIG. 9. The training data includes m data samples, each comprising a set of input values $x_1, x_2, \ldots, x_6$ and a set of expected outputs $E(y_1)$, $E(y_2)$, and $E(y_3)$ that the perceptron network is expected to produce as a result of input of the associated input values.

In order to train the perceptron network, a measure of the disparity between expected outputs and generated outputs needs to be iteratively minimized. For example, the error with respect to output i, $E_i$, may be modeled as:

$$E_i = \frac{1}{2}(E(y_i) - y_i)^2$$

where $E(y_i)$ is the expected output and $y_i$ is the observed output from perceptron node $n_1$. This error model allows for calculation of an expression for the partial derivative of the error associated with output i, $E_i$, with respect to the weight of an input edge j connecting node i with input $x_j$ as follows:

$$\frac{\partial E_i}{\partial w_j} = E_i\left(\frac{\partial E_i}{\partial w_j}\right) = E_i\left(\frac{\partial}{\partial w_j}\left[E(y_i) - g\left(\sum_{j=o}^{n} w_j x_j\right)\right]\right) = E_i\left(\frac{\partial g()}{\partial w_j}\right)x_j$$

In turn, this allows for initial, default weights assigned to the edges of the perceptron network to be adjusted, during a training session, by the following algorithm:

```
1  do
2  {
3      for d = 0 to m
4      {
5          use x_1, x_2, ... x_p in Dd
6          for i = 1 to n
7          {
8              E_i = E(y_1) - g(Σ_{q-1}^{p} w_q, x_p)
9              for k = 1 to p
10             {
11                 w_{k,i} = w_{k,i} + αE_i(dg()/∂wk)x_k
12             }
13         }
14     }
15 } until convergence
```

In this algorithm, the weights are continuously adjusted until some convergence parameter is satisfied or maximum number of iterations have been executed. In each iteration of the do-loop of lines 1-15, each sample data is considered, in turn, in the inner for-loop of lines 3-14. For each data sample, in the inner for-loop of lines 6-13, the weights of all links into each node are adjusted based on the computed partial derivative of the observed error with respect to the weight, as shown on line 11. The term "α" is the training rate for the learning algorithm. This technique essentially represents a gradient descent that iteratively reduces the squared error in expected output versus observed output. Multi-node-level neural networks can be trained with a slightly more complex algorithm, in which errors are propagated in both forward and backward directions between node layers.

Once trained, a neural network responds to input signals by generating output signals, generally implementing a complex, non-linear function. Neural networks can also be intermittently or continuously retrained, so that, over time, the complex non-linear function represented by the neural network reflects previous signal-processing experience.

Physical, Node Implementation for Neural-Network, Perceptron-Network, and Other Parallel, Distributed, Dynamical Network Nodes that Represents Various Embodiments of the Present Invention Most neural-network-based systems, to date, are essentially software simulations of neural-network behavior. Nodes are implemented as data structures and accompanying routines, and the nodes and edge weights are iteratively updated in conventional, sequential-instruction-execution fashion. As a result, although many useful characteristics of neural networks can be exploited, the neural networks do not provide the computational speeds obtained in truly parallel computing systems, including the human brain. Moreover, simulation of neuron-like functionalities, including edge-weight dynamics and leaky integration, may be fairly computationally expensive, particularly when carried out repetitively, in sequential fashion.

For this reason, there have been many attempts to build physical neural networks using a variety of different implementation strategies and materials. However, to date, no physical implementation has come even close to the speed and computational efficiency of even simple biological signal-processing structures. Problems include providing for large numbers of dynamical connections, a variety of manufacturing and assembly constraints, problems with heat dissipation, problems with reliability, and many other problems.

Embodiments of the present invention are directed to a new approach for constructing networks of connected computational nodes, such as neural networks and perceptron networks. Various embodiments of the present invention exploit the memristive characteristics of nanowire junctions. It turns out that the memristive characteristics of nanowire junction that represent an annoyance for fabricating traditional logic circuits are the characteristic needed for dynamical edges in neural networks, perceptron networks, and other parallel, distributed, dynamic processing networks comprising interconnected computational nodes. Thus, a relatively simply fabricated, nanoscale nanowire junction provides the functionality for a dynamical edge at nanoscale size, without the need for programming or algorithmic computation. Because the number of connections between nodes vastly exceeds the number of nodes in most naturally occurring signal-processing and computational structures, including the human brain, it is desirable that the connections used to implement a hardware network of computational nodes be small, easily fabricated, and have intrinsic, physical characteristics close to those needed for edges, so that the dynamical nature of connections need not be programmed into the hardware or simulated by hardware-based logic circuits.

Figure 11A:
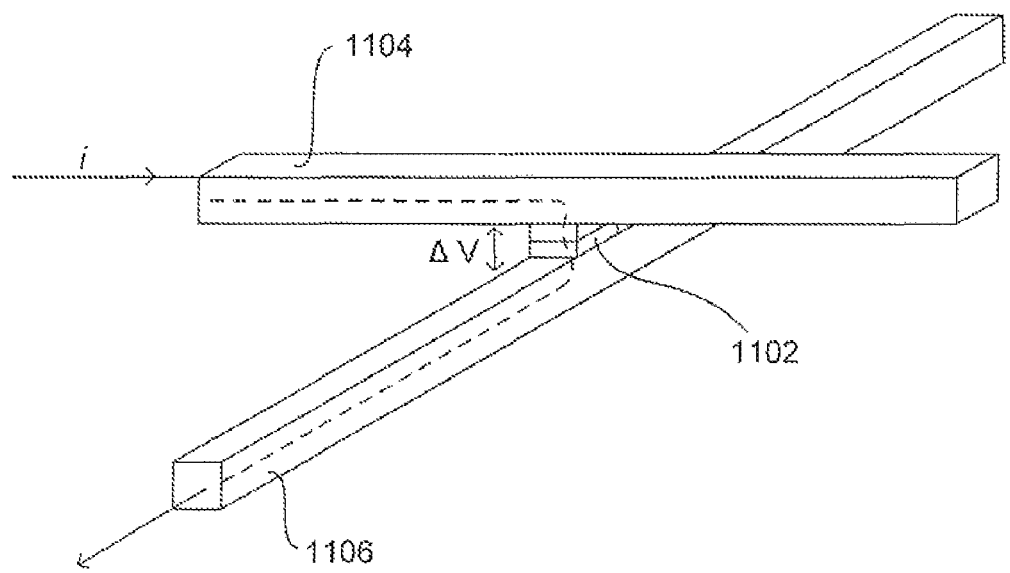
FIGS. 11A-B illustrate the memristive characteristics of nanowire junctions that can be fabricated by currently available techniques.
Figure 11B:
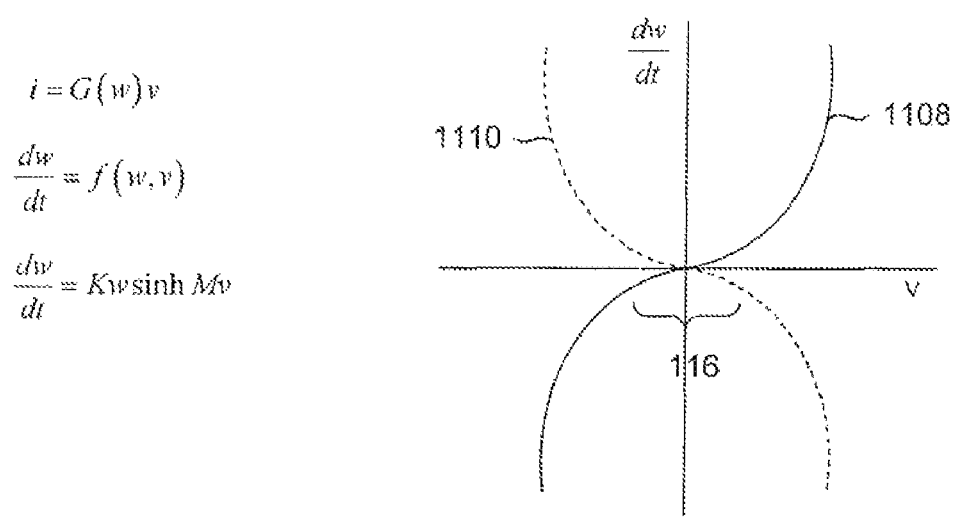

FIGS. 11A-B illustrate the memristive characteristics of nanowire junctions that can be fabricated by currently available techniques. FIG. 11A illustrates a single nanowire junction. The nanowire junction comprises one or more layers of memristive material 1102 at the junction between a first, input nanowire 1104 and a second, output nanowire 1106. The current follows the following current model, within certain current ranges and voltage ranges:

$$i = G(w)v$$

where w is a state variable of the junction, G(w) is the conductance of the junction, and v is the voltage applied across the junction. The rate of change of the state variable with respect to time is a function both of the value of the state variable and the voltage applied to the nanowire junction at the current time:

$$\frac{dw}{dt} = f(w, v)$$

For a certain class of nanowire junctions, modeled by a single state variable w that represents the conductivity of the memristive material, the rate of change of the state variable, or conductivity, with time can be approximated as:

$$\frac{dw}{dt} = Kw\sinh Mv$$

where K and M are constants, for a range of values of |w| from 0 to a maximum value $w_{max}$. Outside of this range, $$\frac{dw}{dt}$$

is assumed to be 0. FIG. 11B shows a plot of this expression. The solid curve 1108 in FIG. 11B shows a plot of the above expression for particular, assumed values of K and M. The rate of change of conductivity with time may also follow the mirror-image curve 1110, plotted in dashes in FIG. 11B, in different types of junction materials, or it may vary by other, more complex non-linear functions. However, in general, the memristive behavior of nanowire junctions is such that the conductance is decidedly non-linear with respect to applied voltage. Small applied voltages of either positive or negative polarity across the junction, in the range of small voltages 1116 about the voltage 0, do not produce significant change in the conductivity of the junction material, but outside this range, increasingly large applied voltages of positive polarity result in increasingly large rates of increase in the conductivity of the junction material, while increasingly large voltages of negative polarity result in steep decreases in the rate of change of conductivity of the junction material. The conductance of the nanowire-junction device is proportional to the conductivity of the junction material.

It should be emphasized that the above-described model for the change in conductance of a memristive nanowire junction represents only one possible type of relationship between memristive-nanowire-junction conductance and applied voltage. The computational nodes and computational-node-network implementations that represent embodiments of the present invention do not depend on the relationship between conductance and applied voltage to correspond to the above-described mathematical model, but only that the change in conductance elicited by application of 1 V across the junction for a given period of time t is substantially less than the change in conductance elicited by application of 2 V across the junction for the same time t, and that the conductance change elicited by applied voltages of a first polarity have an opposite sign, or direction, than applied voltages of a second polarity. The relationship need not have mirror symmetry, as does the model relationship described above, since the time t can be adjusted for different polarities in order to achieve a desired edge-weighting model.

Figure 12A:
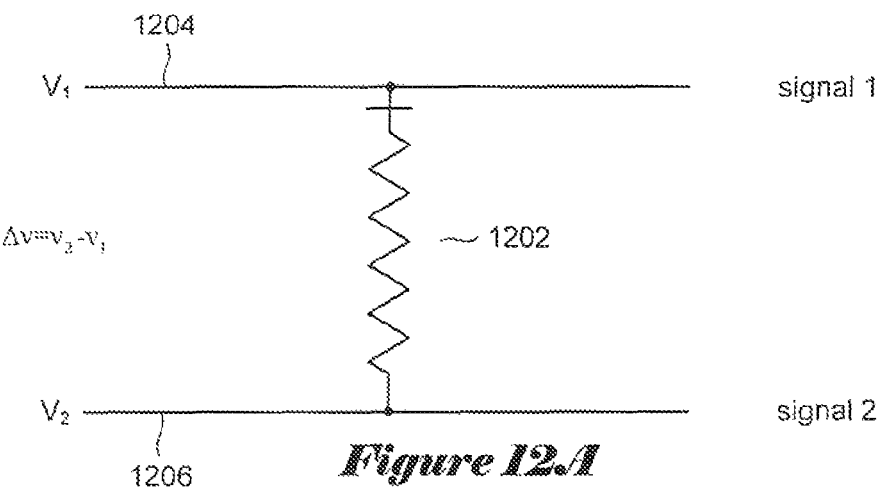
FIGS. 12A-E illustrate memristive, nanowire-junction conductance, over time, with respect to voltage signals applied to two signal lines that are connected by a memristive, nanowire junction.
Figure 12B:
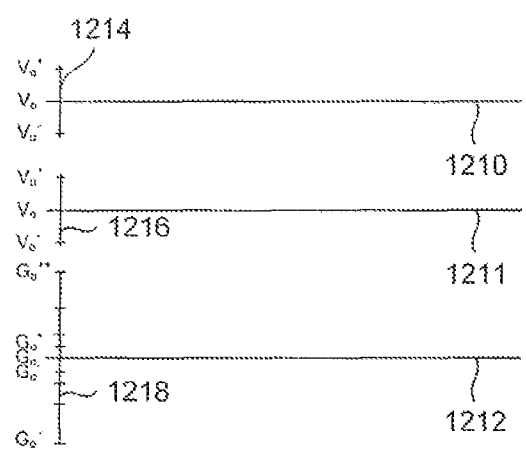
Figure 12D:
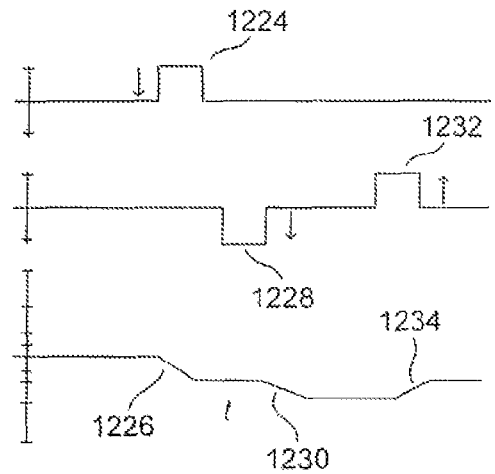
Figure 12C:
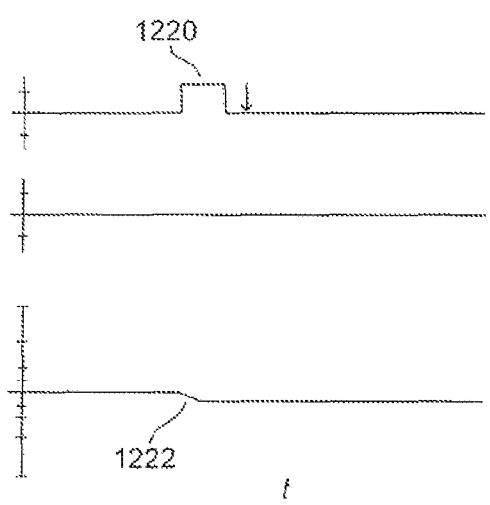
Figure 12E:
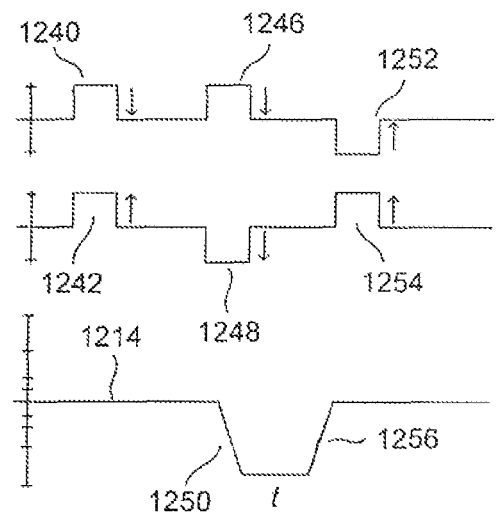

FIGS. 12A-E illustrate memristive, nanowire-junction conductance, over time, with respect to voltage signals applied to two signal lines that are connected by a memristive, nanowire junction. FIG. 12A shows the memristive nanowire junction in symbolic terms. The memristive nanowire junction 1202 interconnects a first signal line 1204 with a signal line 1206, referred to as "signal line 1" and "signal line 2," respectively. The voltage applied to the memrister 1202, Δv, is $v_2-v_1$, where $v_2$ and $v_1$ are the voltage signals currently applied to signal line 2 and signal line 1, respectively. FIG. 12B shows a plot of the voltage signals applied to signal lines 1 and 2, and the conductance of the memristive device, over a time interval. Time is plotted along a horizontal direction for signal line 1, signal line 2, and the memristive device. The voltage signal currently applied to signal line 1 is plotted with respect to a vertical axis 1214, the voltage currently applied to signal line 2 is plotted with respect to a second vertical axis 1216, and the conductance of the memristive device is plotted with respect to a third vertical axis 1218. FIGS. 12C-E all use illustration conventions similar to those used in FIG. 12B.

As shown in FIG. 12B, when a constant voltage $v_0$ is applied to both signal lines, represented by horizontal lines 1210 and 1211, the conductance of the memristive device remains at an initial conductance $G_0$ 112. In FIG. 12C, a short, positive voltage pulse 1220 is applied to the first signal line. That short pulse generates a brief, negative potential across the memristive junction, resulting in a decrease 1222 in the conductance of the memristive junction over the time interval of the positive pulse. FIG. 12D illustrates effects of several pulses applied to both signal lines 1 and 2. A first pulse 1224 applied to signal line 1 results, as in FIG. 12C, with a small decrease in conductance of the memristive device 1226. A brief negative-voltage pulse 1228 applied to the second signal line causes an additional small decrease in conductance of the memrister 1230. A brief positive pulse applied to the second signal line results in a small increase in the conductance of the memristive device 1234.

In all of the cases so far illustrated, the pulses applied to the first and second lines are separated from one another in time, so that voltage pulses on both signal lines do not occur at the same point in time. Thus, the small applied voltages fall within the range of voltages (1116 in FIG. 11B) that results in only small rates of conductivity change in the memristive-device material. However, as shown in FIG. 12E, when voltages of opposite polarity are simultaneously applied to the two signal lines, the resulting voltage applied across the memrister falls outside of the small-voltage range (1116 in FIG. 11B), resulting in relatively large rates of conductivity change. In FIG. 12E, two simultaneous voltage pulses 1240 and 1242 of positive polarity result in no change in the voltage applied to the memristive junction, and therefore result in no change to the conductance of the memristive device 1244. However, a simultaneously applied positive pulse 1246 on the first signal line and negative pulse 1248 on the second signal line result in a relatively large applied voltage of negative polarity to the memristive device, resulting in a large negative change in the conductance of the device 1250. By contrast, simultaneous pulses of reversed polarities 1252 and 1254 result in a relatively large increase in conductance of the device 1256. Were the conductivity/voltage curves of the memristive-device material to have the opposite conductivity-change behavior, represented by dashed curve in FIG. 11B, or were the direction of the voltage convention for computing Δv reversed, the conductance changes in FIGS. 12B-E would have opposite directions from those shown.

In summary, memristive nanowire junctions show non-linear conductance changes as a result of applied voltages. The conductance of a memristive nanowire junction reflects the history of previously applied voltages, and the rate of change of the conductance at a given instance in time of a memristive nanowire junction depends on the magnitude and polarity of the applied voltage at that instance in time, in addition to the conductance of the memristive nanowire junction. Memristive nanowire junctions have polarities, with the signs of conductance changes reflective of the polarities of applied voltages. A memristive nanowire junction thus has physical characteristics that correspond to the model characteristics of the dynamical edges of a neural network, perceptron network, or other such network of computational entities.

Figure 13:
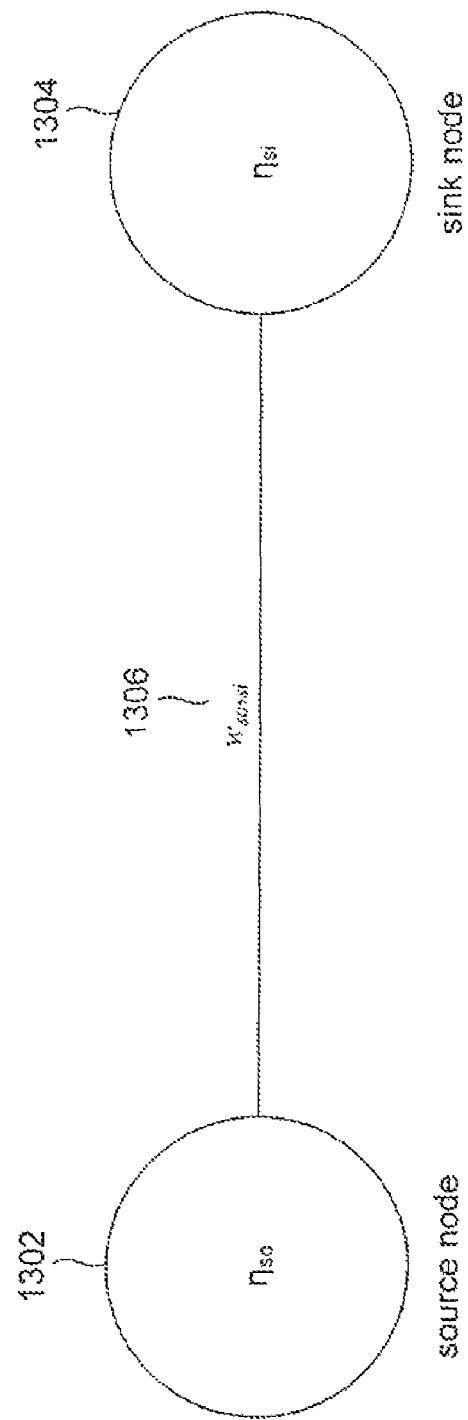
FIG. 13 shows an abstract model of two computational nodes connected by a dynamical edge.
Figure 14:
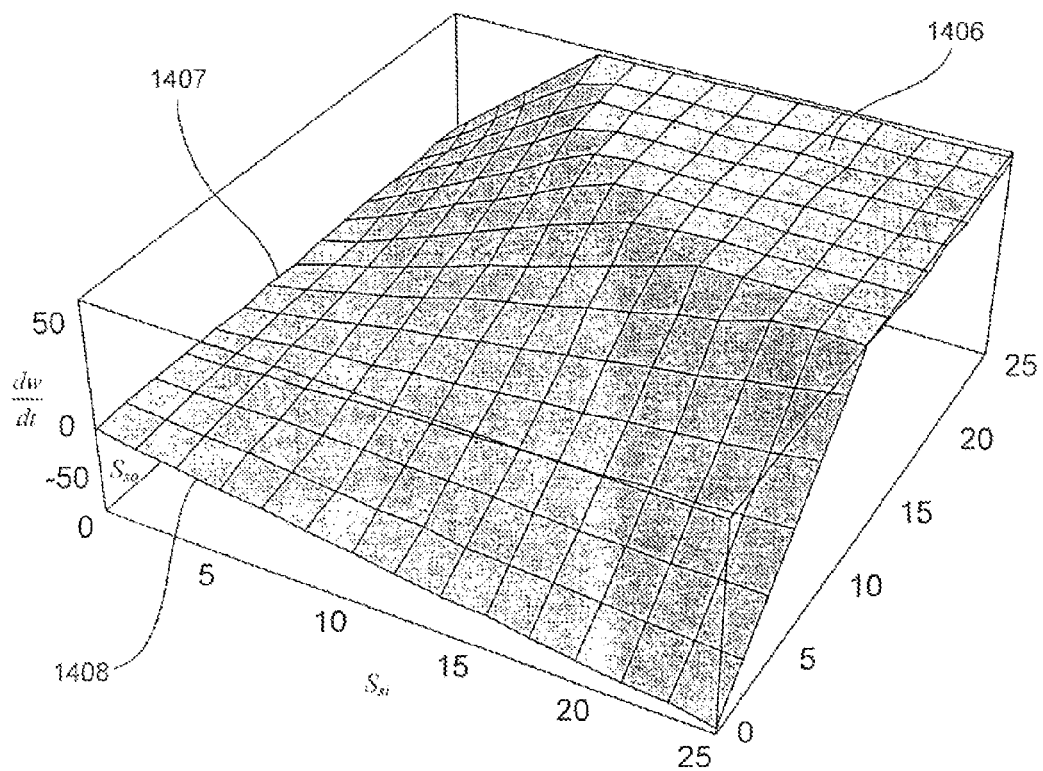
FIG. 14 shows a plot of the rate of change of edge weight with respect to time versus $S_{si}$ and $S_{so}$.

FIG. 13 shows an abstract model of two computational nodes connected by a dynamical edge. The first computational node 1302 is a source node, $n_{so}$, and the second computational node 1304 is a sink node $n_{si}$, with the edge joining the two nodes forming a current weight of $W_{so,si}$ 1306. One mathematical model for the change in edge weight, with respect to time, is:

$$\frac{dw}{dt} = S_{si}\left(-\frac{1}{\tau_s}w + kS_{so}\right) = -\frac{1}{\tau_s}(wS_i) + kS_{si}S_{so}$$

where $S_{so}$ is the activation of the source node, $S_{si}$ is the activation of the sink, and $\tau_s$ is a time constant. As can be seen in the above equation, the rate of change of the weight, with respect to time includes both a Hebbian term, where the weight increases proportional to the product of the activations of both the source and sink nodes, and a non-Hebbian term that represents a decay of the edge weight, over time, proportional to the activation of the sink node and the current edge weight. FIG. 14 shows a plot of the rate of change of edge weight with respect to time versus $S_{si}$ and $S_{so}$. As can be seen in FIG. 14, when the activations of both the source and sink nodes are high, the rate of change of the edge weight is a large positive value, represented by the flattened peak 1406 in FIG. 14. The peak is flattened due to an upper cut-off value for $$\frac{dw}{dt}$$

in FIG. 14. When the activation of the sink node is low, the rate of change of the edge weight remains constant and low, despite the activation level of the source node, as observed in the horizontal edge of the plotted $$\frac{dw}{dt}$$

surface 1407 in the $S_{si}=0$ plane in FIG. 14. When the activation of the source node is low, the edge weight has a relatively low, constant negative change with respect to time, as observed in the negatively sloped line 1408 representing the intersection of the plotted $$\frac{dw}{dt}$$

surface with the $S_{so}=0$ plane. This model approximates certain of the behavior of neurons, discussed in the previous section. When pre-synaptic and post-synaptic neuron firings are correlated in time, synapse strength increases. However, with lack of continuing stimulation, synapse strength decays over time.

Figure 15:
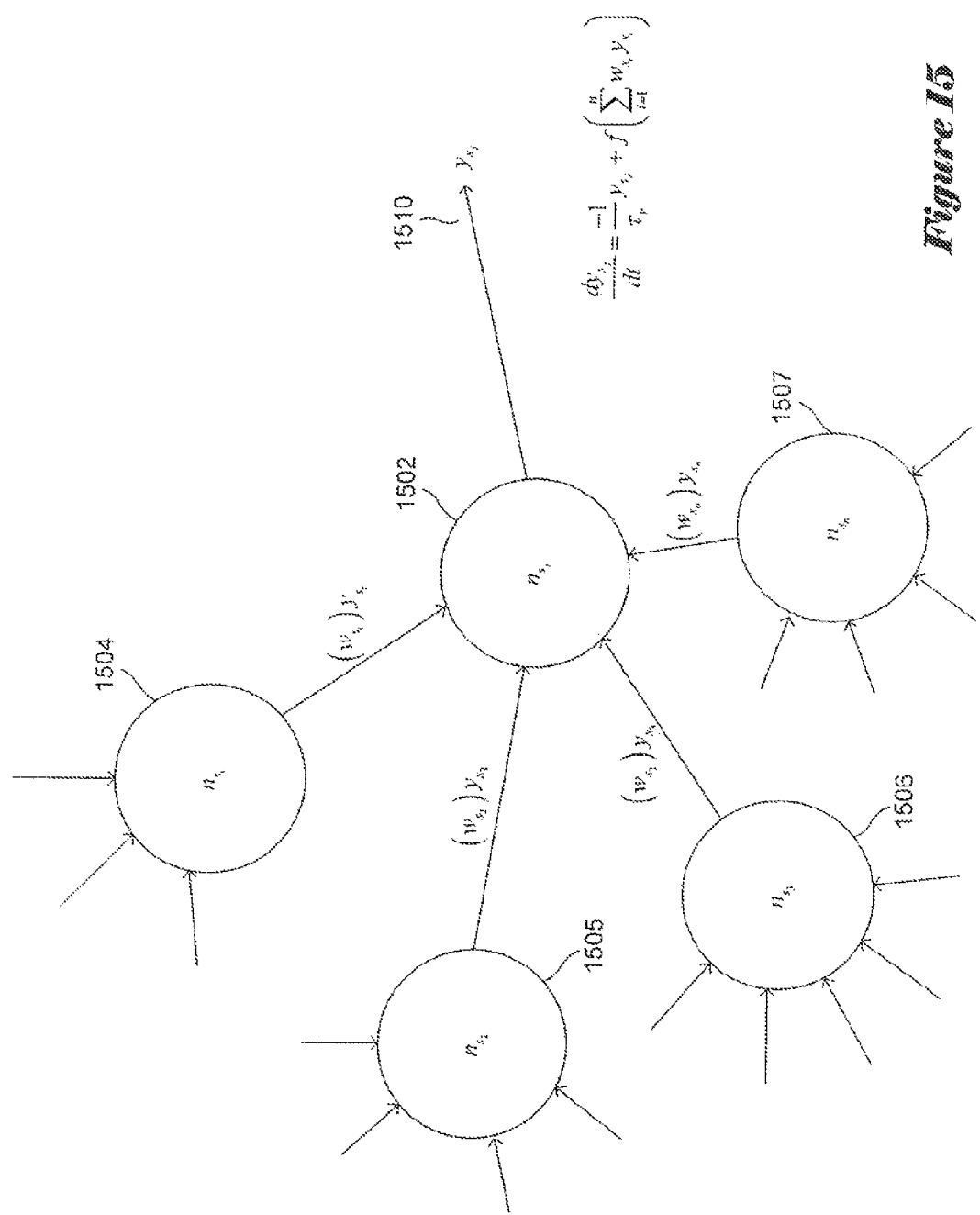
FIG. 15 illustrates a mathematical model for a computation node.

FIG. 15 illustrates a mathematical model for a computation node. In FIG. 15, a small portion of a neural network is shown, consisting of a node $n_{s_j}$ 1502 interconnected with n upstream nodes 1504-1507 and producing an output signal proportional to an internal node state $y_{s_j}$ 1510. The change in the internal state of node $n_{s_j}$ 1502 can be modeled as:

$$\frac{dy_{s_j}}{dt} = -\frac{1}{\tau_r}y_{s_j} + f\left(\sum_{i=1}^{n} y_{s_i}\right)$$

where $\tau_r$ is a time constant that occurs in a state-decay term. Thus, the state of a computational node is computed as some non-linear function of the summed weighted input signals as well as a negative decay term that is proportional to the current state of the node.

Embodiments of the present invention include computational nodes interconnected by memristive nanowire junctions that provide operational characteristics similar to the desired model characteristics discussed with reference to FIGS. 13-15. The computational nodes that represent embodiments of the present invention are defined by hardware implementations, physical characteristics of nanowire memristive junctions, the form of signal spikes emitted by computational nodes, and a state-transition diagram for the computational nodes. These aspects of the computational nodes that represent embodiments of the present invention are next described.

Figure 16:
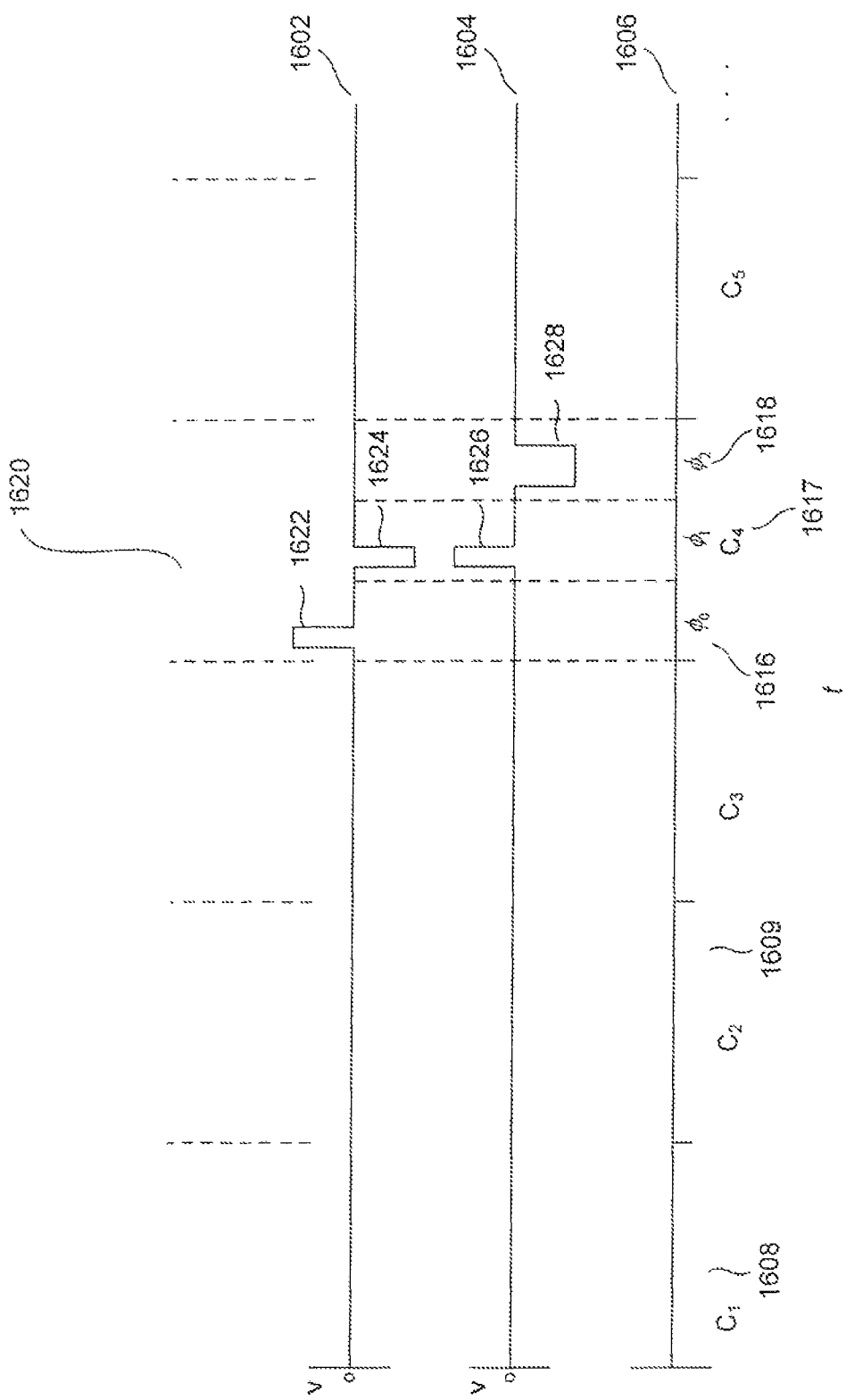
FIG. 16 shows a spike, or output signal, produced by a computational node that represents one embodiment of the present invention.

FIG. 16 shows a spike, or output signal, produced by a computational node that represents one embodiment of the present invention. A spike comprises a forward spike, plotted in a first voltage vs. time plot 1602 in FIG. 16, and a backward spike, plotted in a second voltage vs. time plot 1604. In networks of computational nodes that represent embodiments of the present invention, the nodes are synchronized by a global clock. Time is divided, as shown by the time line 1606 in FIG. 16, into a series of cycles, $C_1, C_2 \ldots$. Each cycle, in turn, is divided into three phases, $\phi_0, \phi_1,$ and $\phi_2$ 1616-1618, as shown in FIG. 16 for cycle $C_4$. During any given cycle, a computational node may fire, or spike. When a computational node fires, it sends a forward spike to its output (1510 in FIG. 15) and sends backward spikes in a reverse direction to all upstream nodes (1504-1507 in FIG. 15). In FIG. 16, a computation-node spike, comprising a forward spike and backward spike, is shown plotted within the three phases 1616-1618 of cycle $C_4$ 1620. The forward spike comprises a positive voltage pulse 1622 in phase $\phi_0$ and a negative voltage pulse 1624 of equal magnitude, in phase $\phi_1$. The backward spike includes a positive voltage pulse 1626 in phase $\phi_1$, and a broader, negative pulse 1628 in phase $\phi_2$.

Figure 17:
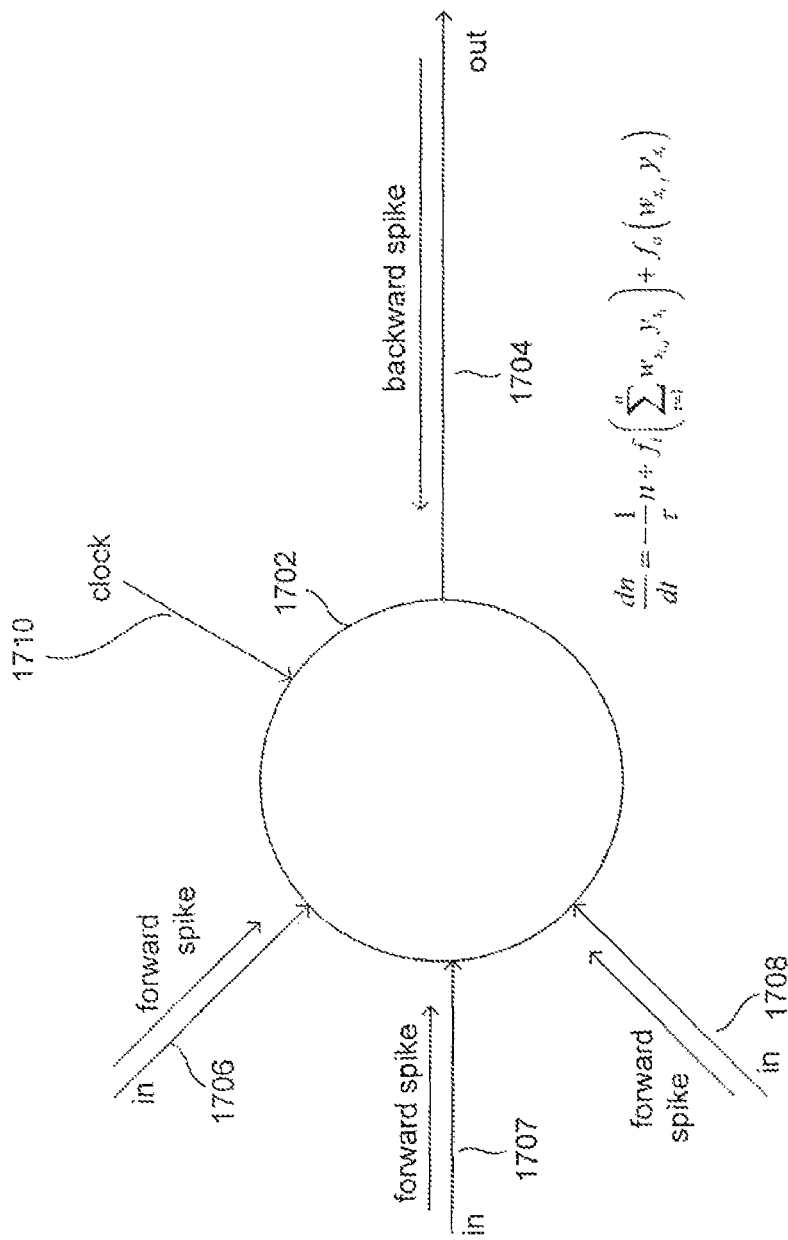
FIG. 17 shows a computational node that represents one embodiment of the present invention during a resting, or non-spiking, state referred to as the "processing mode."

FIG. 17 shows a computational node that represents one embodiment of the present invention during a resting, or non-spiking, state referred to as the "processing mode." The node 1702 receives backward spikes from downstream nodes on the output signal line 1704 and forward spikes from upstream nodes via input signal lines 1706-1708. The node also receives global clock ticks via a clock input 1710. During processing mode, the change in node state with respect to time can be modeled by a continuous differential equation:

$$\frac{dn}{dt} = -\frac{1}{\tau}n + f_i\left(\sum_{i=1}^{n} w_{s_i,j} y_{s_i}\right) + f_o\left(\sum_{k=1}^{m} w_{s_j,k} y_{s_j}\right)$$

which includes positive terms for backward spikes and forward spikes and a negative term representing a decay constant for the node state.

Figure 18:
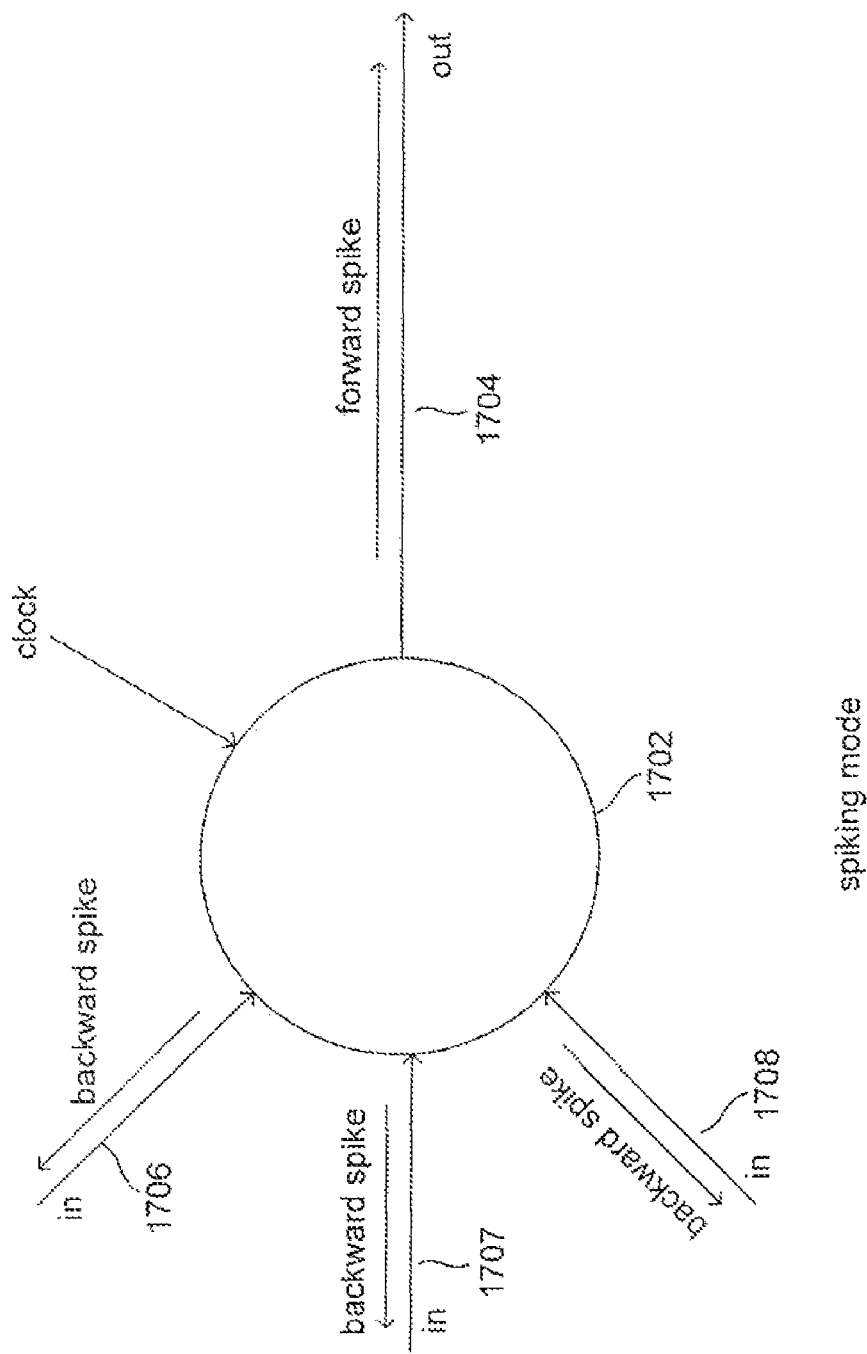
FIG. 18 shows the computational node of FIG. 17, which represents one embodiment of the present invention, in spiking mode.

FIG. 18 shows the computational node of FIG. 17, which represents one embodiment of the present invention, in spiking mode. In spiking mode, the node 1702 generates a forward spike on the output signal line 1704 and generates backward spikes on the input signal lines 1706-1708.

Figure 19:
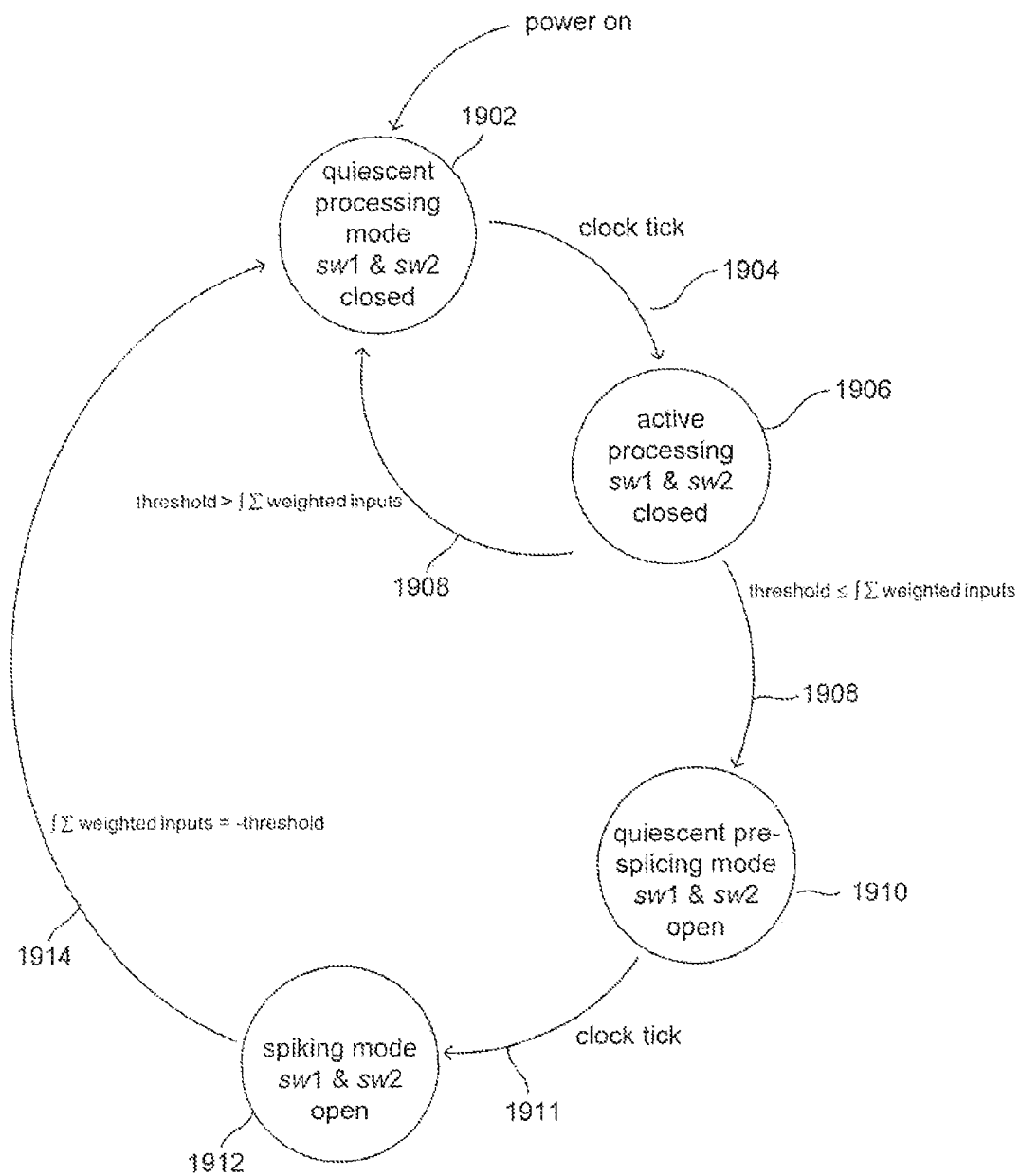
FIG. 19 shows a state-transition diagram for a computational node that represents one embodiment of the present invention.

FIG. 19 shows a state-transition diagram for a computational node that represents one embodiment of the present invention. As shown in FIG. 19, the node, on power on, initially resides in a quiescent processing mode 1902 in which the node collects and integrates forward spikes received from upstream nodes and downward spikes received from downstream nodes. In FIG. 19, the nodes representing states include indications of whether first and second switches sw1 and sw2 are open or closed. These switch states are discussed below, with reference to FIG. 20.

On each tick of the global clock, the node transitions 1904 to an active processing mode 1906 in which the node compares the sum of weighted inputs received, integrated over time, to a threshold value. If the integrated sum of weighted inputs is less than the threshold value, then the node immediately transitions 1908 back to the quiescent processing mode 1902. However, in the case that the threshold is exceeded by the integrated sum of weighted inputs, the node transitions from active processing mode 1906 to a quiescent pre-spiking mode 1910. When the next clock tick is received 1911, the node transitions to spiking mode 1912, during which the node transmits forward and backward spikes, as shown in FIG. 18, and resets the integrated sum of weighted input value to a negative threshold value while transitioning 1914 back to quiescent processing mode 1902.

Figure 20:
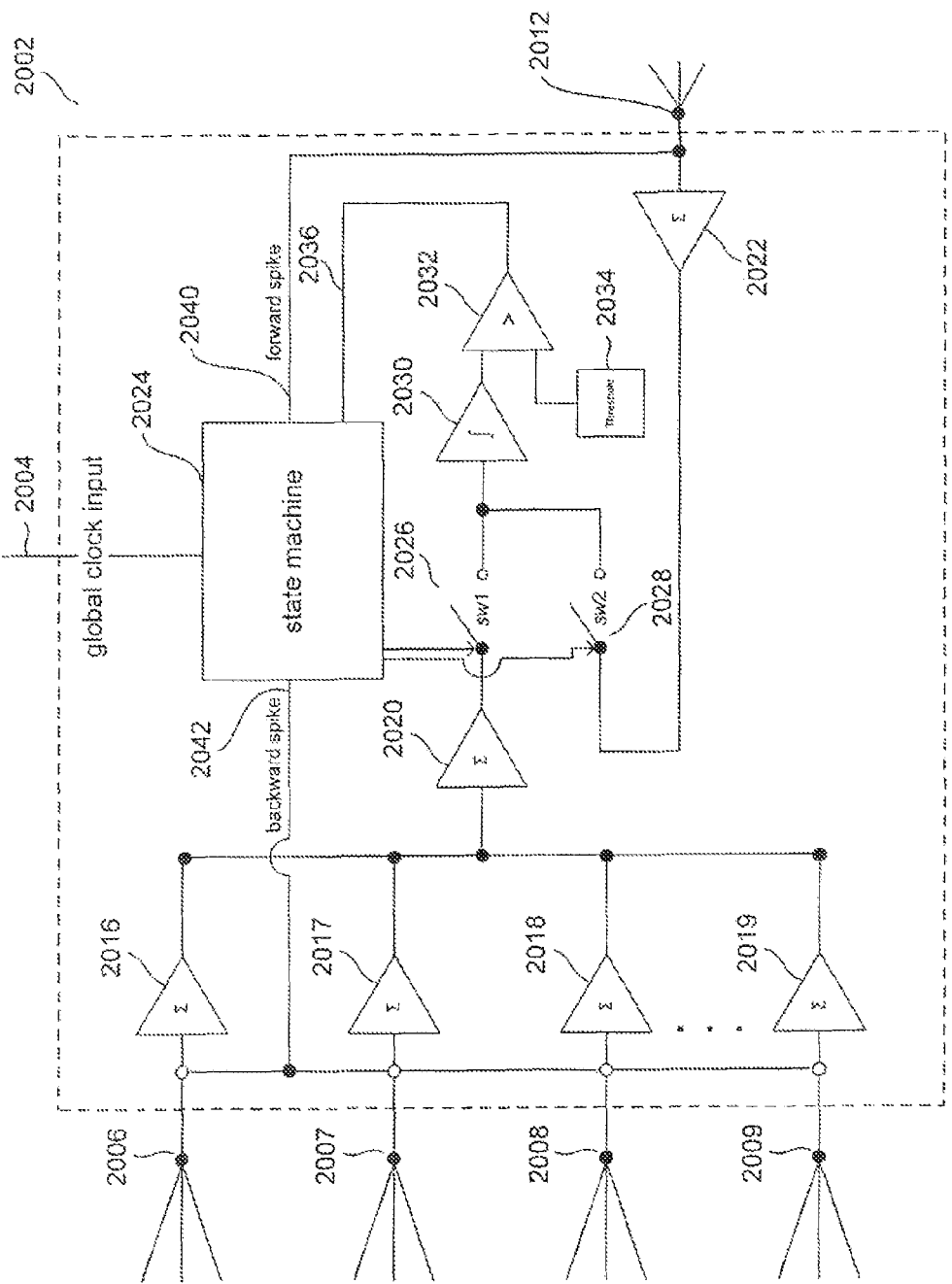
FIG. 20 shows a schematic diagram of a computational node that represents one embodiment of the present invention.

FIG. 20 shows a schematic diagram of a computational node that represents one embodiment of the present invention. The computational node 2002 receives a global clock input 2004 and an essentially arbitrary number of potentially branched inputs 2006-2009. The computational node 2002 emits forward spikes on a potentially branched output signal line 2012. The inputs are summed by summing amplifiers 2016-2019, and their outputs fed into a global summing amplifier 2020. Backward spikes received through the output signal line 2012 are summed by an additional summing amplifier 2022. A state machine and output-signal generator 2024 control two switches, sw1 2026 and sw2 2028, opening and closing the switches as indicated in the state-transition diagram shown in FIG. 19. When the switches are both closed, the computational node is in processing mode, with summed input signals output by summing amplifiers 2020 and 2022 input to a leaky integrator 2030. Output of the integrator is fed into a threshold comparator 2032 which compares the leaky-integrator output to a threshold value 2034. The comparison value is fed into the state machine via signal line 2036. When the output signal of the comparator transitions from 0 to 1, indicating accumulations of input above a threshold value, the state machine prepares for issuing a signal in spiking mode by opening switches sw1 and sw2, 2026 and 2028, respectively. Then, when a next clock tick is received via the global clock input 2004, the state machine triggers issue of forward-spike and backward-spike signals to the forward spike output signal line 2040 and the backward spike output signal line 2042. The forward spike is issued to the output signal line 2012, and the backward spike is issued to all or a selected subset of the input signal lines 2006-2009. In certain embodiments of the present invention, each input, such as input 2006, represents a set of inputs from a particular class of upstream nodes. The input signals may be inhibitory, in which case the summing amplifier receiving the input may invert the signal, or, alternatively, the weights associated with the input signal lines are negatively valued. The input signals may be excitatory, in which case the summing amplifier associated with the excitatory inputs sums the inputs without inversion, or, alternatively, the inputs are associated with positive weights, in contrast to the inhibitory signals.

Figure 21:
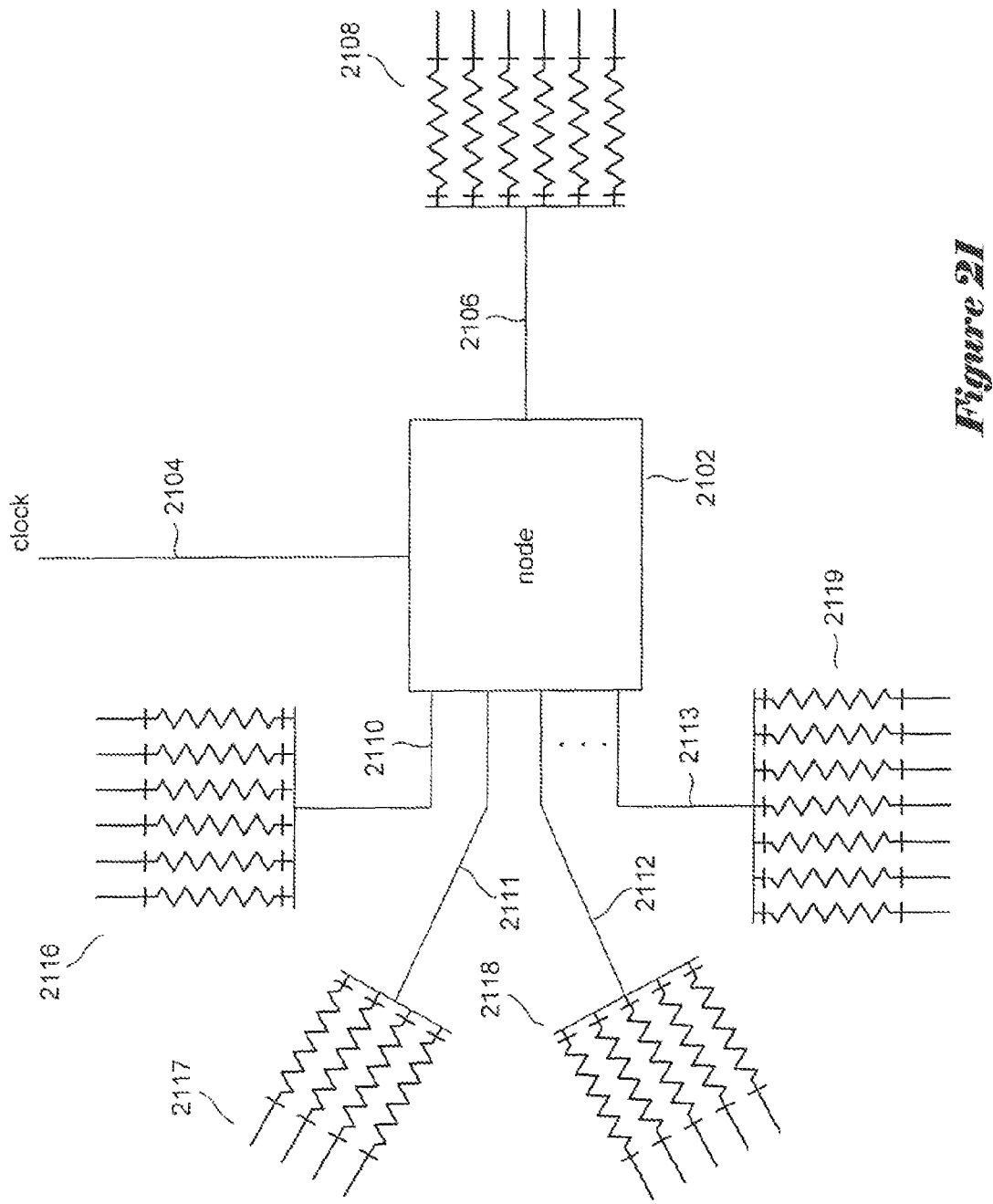
FIG. 21 shows a computational node that represents an embodiment of the present invention within a computational network.

FIG. 21 shows a computational node that represents an embodiment of the present invention within a computational network. The computational node 2102 is connected to the global clock signal 2104, an output signal line 2106, in turn, branching through a number of memristive nanowire junctions 2108 to a number of downstream computational nodes, and input signal lines 2110-2113, each, in turn, branching through a number of memristive nanowire junctions 2116-2119 to a number of downstream computational nodes Of course, in each application, the number of input signal lines, input-signal-line branches to upstream nodes, and output-signal-line branches to downstream nodes may vary, depending on the non-linear function implemented by the computational-node network. Please note that the node both receives and transmits spikes on input signal lines and output signal lines. Forward spikes are received on input signal lines, and backward spikes are received on the output signal line. Forward spikes are transmitted on the output signal line, and backward spikes are transmitted on the input signal lines.

Figure 22:
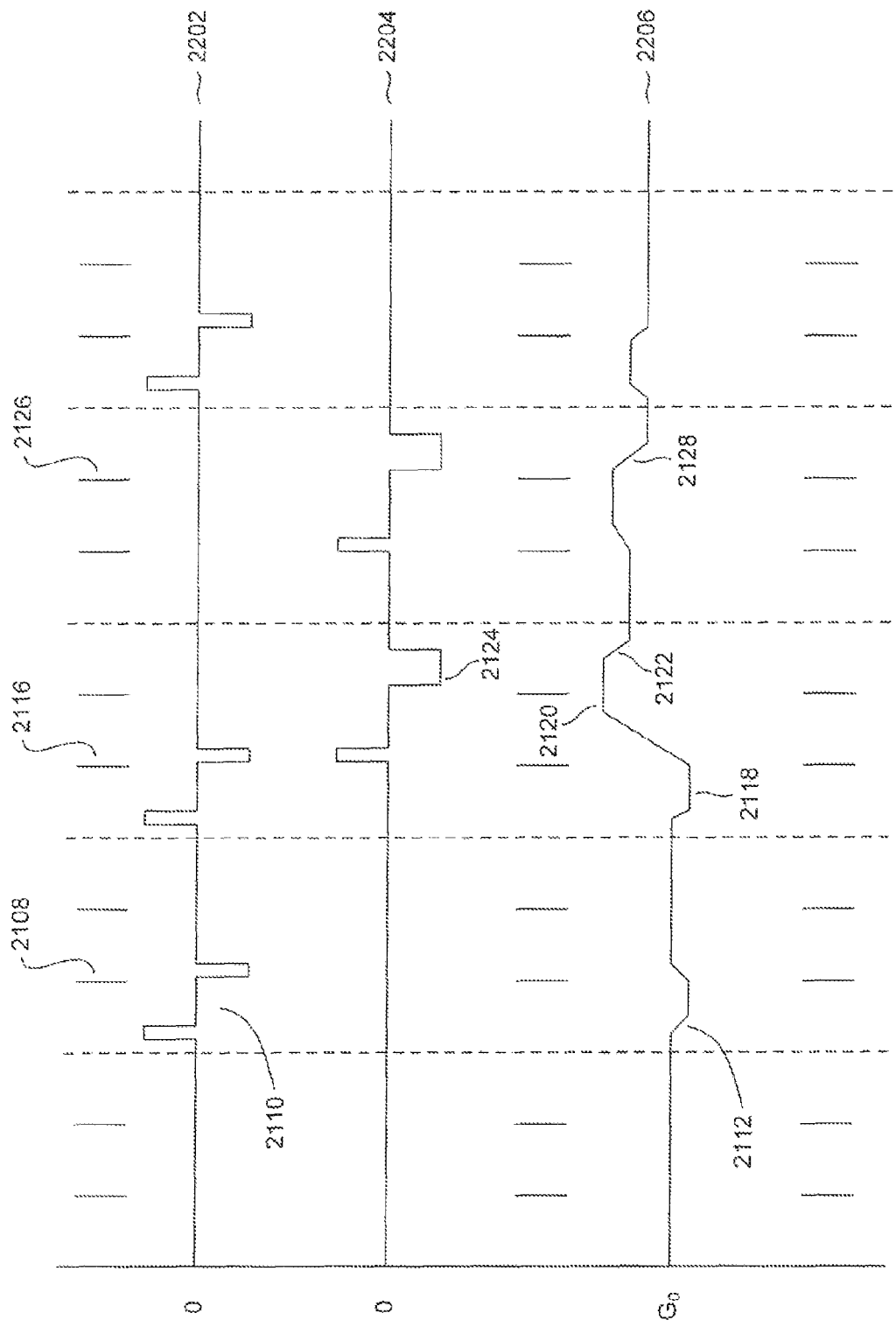
FIG. 22 illustrates edge-weight transitions resulting from forward and backward spikes traversing an edge according to one embodiment of the present invention.

FIG. 22 illustrates edge-weight transitions resulting from forward and backward spikes traversing an edge according to one embodiment of the present invention. In FIG. 22, forward spikes are plotted along a first time line 2202, backward spikes are plotted along a second time line 2204, and the weight, or conductance, of the edge is plotted along a third time line 2206. As in FIG. 16, the time line is divided into cycles and phases. In the second cycle 2108, a forward spike traverses the edge 2110, resulting in a brief decrease in conductance and recovery of the initial conductance 2112. In a third cycle 2116, both a forward and backward spike traverse the edge. This results in an initial conductance decrease 2118 followed by a large conductance increase 2120, in turn followed by a conductance decrease 2122 as a result of the broad negative pulse 2124 of the backward spike. A single backward spike in a third cycle 2126 results in a small, net decrease in conductance 2128 of the edge. Thus, with the weight of the edge represented by the conductance of the edge, and measured by the current flowing through the edge, simultaneous forward and backward spikes greatly increase the weight of the edge, following a Hebbian-learning paradigm, and backward spikes, because of the broader negative voltage pulse, cause a slow decay of the edge weight when the backward spikes do not occur concurrently with forward spikes. Forward spikes, by themselves, do not change the edge conductance. Thus, the properties of memristive nanowire junctions combined with the signal spike illustrated in FIG. 16 and computational-node behavior synchronized by the global clock result in edge reinforcement when source and sink nodes simultaneously fire, and a slow decay of edge weights when the sink node fires, but the source node is quiescent.

Figure 23:
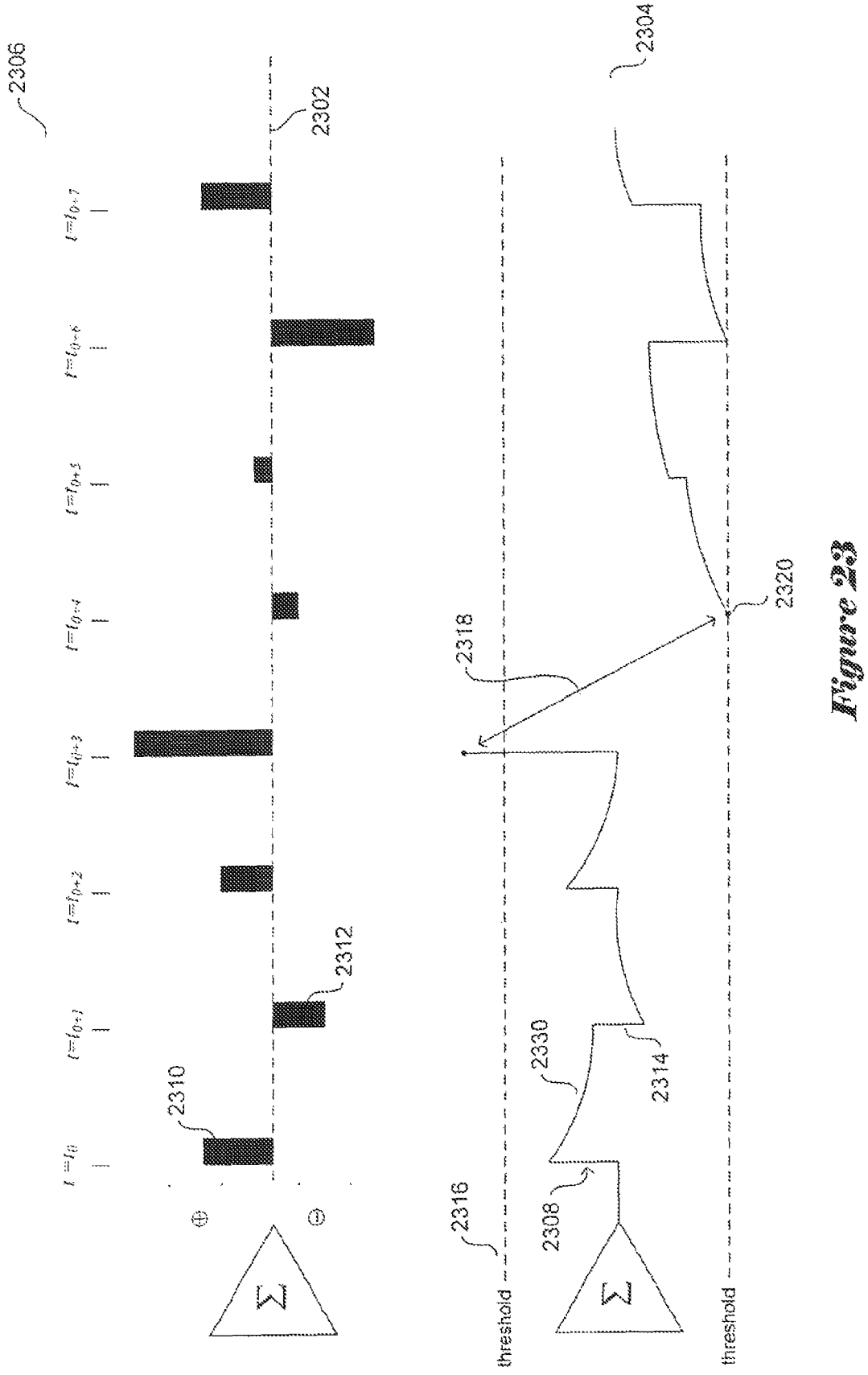
FIG. 23 shows the leaky-integrator output, representing the state of a computational node, over time as a response to summed input signals according to one embodiment of the present invention.

FIG. 23 shows the leaky-integrator output, representing the state of a computational node, over time as a response to summed input signals according to one embodiment of the present invention. In FIG. 23, the sum of input signals generated by summing amplifiers (2020 and 2022 in FIG. 20) is shown plotted along a first time line 2302, and the leaky-integrator output of the leaky integrator (2030 in FIG. 20) is shown plotted along a second time line 2304. The signal sums are computed and fed into the integrator at discrete intervals of time, labeled $t_0, t_{0+1}, \ldots, t_{0+7}$ at the top of the figure 2306, corresponding to global-clock ticks. When the sum of the signals is positive, the integrator output increases, such as the increase 2308 corresponding to the positive signal sum 2310 at time $t_0$. Similarly, when the signal sum is negative 2312, the corresponding integrator output falls 2314. At any point in time when the integrator output exceeds a threshold value 2316, the node transitions 2318 to spiking node, emitting a forward and backward spike, and resetting the integrator output to the value minus the threshold 2320. Then, the integrator continues to integrate summed signals in subsequent time intervals. The integrator is leaky in that, following any transition resulting from summed signal input, such as transition 2308, the integrator state slowly decays, over time, toward 0, as represented by the curved line segment 2330 connecting the integrator output curve between time points $t_0$ and $t_{0+1}$.

Thus, like a biological neuron, a computational node that represents one embodiment of the present invention integrates input signals over time, and fires, or spikes, when the integrated signal exceeds a threshold value. The integrator is leaky, so that threshold-exceeding stimulation must occur over a recent period of time in order to trigger spiking. In other words, signal accumulation has the temporal characteristics of biological neurons. Spatial signal integration may also be achieved, for example by including non-linearities or thresholding characteristics within the summing amplifiers 2016-2019 in FIG. 20. Thus, the computational node and memristive nanowire-junction connections between nodes that represent embodiments of the present invention provide dynamical edge weighting, leaky signal integration, thresholding, and signal generation described by the models discussed with reference to FIGS. 13-15, in turn inspired by observed neuron behavior and characteristics. The nodes, generally far fewer in number than connections, can be fabricated using well-known integrated-circuit-manufacturing techniques and well-know integrated-circuit components, while the dynamical edges can be implemented by currently available nanowire-junction-fabrication techniques. Edge weighting is a physical property of memristive nanowire junctions, and therefore does not involve computation or logic-circuit simulation.

Figure 24:
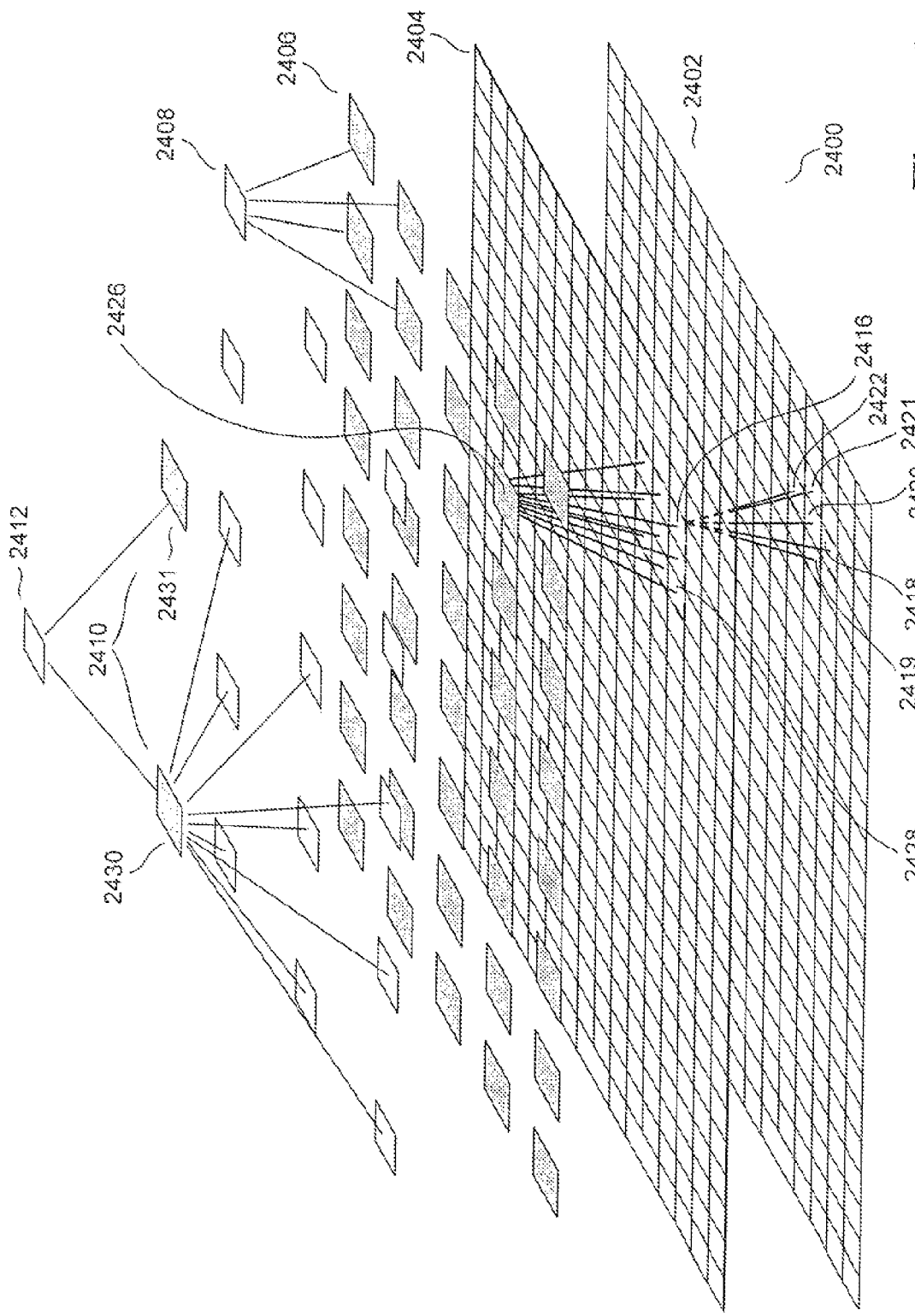
FIGS. 24-25 illustrate an exemplary computational-node network suitable for use in pattern recognition and a variety of other computational tasks and that represents an embodiment of the present invention.
Figure 25:
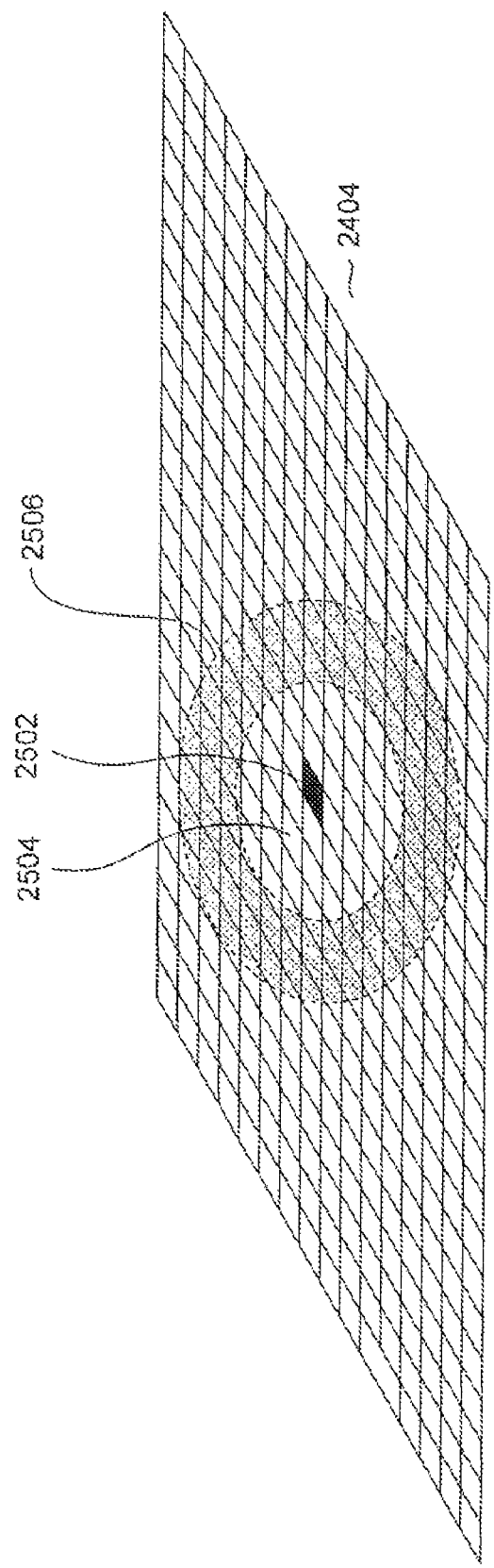

Architecture and Implementation of Computational-Node Networks According to Embodiments of the Present Invention The computational node and inter-node nanowire-junction connections, described in the previous subsection, that represent embodiments of the present invention can be used to fabricate neural networks and other computational-node networks. FIGS. 24-25 illustrate an exemplary computational-node network suitable for use in pattern recognition and a variety of other computational tasks and that represents an embodiment of the present invention. As shown in FIG. 24, the computational-node network 2400 includes a first layer of input nodes 2402, additional layers of intermediate nodes 2404, 2406, 2408, and 2410, and a final, single output node 2412. In different applications, of course, there may be different numbers of node layers, different numbers of nodes within node layers, and an almost limitless number of different interconnections between nodes. In the computational-node network shown in FIG. 24, each node of the first intermediate-node layer 2404, such as node 2416, receives inputs from five input nodes, such as input nodes 2418-2422 aligned with intermediate-node 2416. Similarly, each second-level intermediate node, such as second-level intermediate node 2426, receives inputs from a number of first-level intermediate nodes. In FIG. 24, nine first-level intermediate nodes enclosed within a square dashed line 2428 output signals to the second-intermediate-node-level node 2426, aligned with the central first-intermediate-node-level node at the center of the nine first-level-intermediate nodes. Similarly, third-level-intermediate nodes 2408 receive inputs from corresponding second-level-intermediate nodes, fourth-level-intermediate nodes 2430-2431 receive inputs from corresponding third-level-intermediate nodes, and the output node 2412 receives input from the two fourth-level-intermediate nodes 2430-2431. Thus, computational nodes are interconnected in cascades leading from the output node 2412 down to the input nodes 2402.

FIG. 25 shows the first intermediate level of nodes. Each first-level intermediate node in the first intermediate node level 2404 may also receive lateral inputs from first-level-intermediate nodes within the first intermediate node level. For example, considering first-level-intermediate node 2502, a small disk of nodes 2504 surrounding the considered node 2502 may transmit excitatory signals to the node 2502, and a larger-radius ring 2506 of nodes surrounding the small disk of nodes 2504 may transmit inhibitory signals to node 2502. All other nodes of the first intermediate-node layer, outside the outer radius of this ring 2506, in one embodiment of the present invention, contribute no inputs to node 2502. Lateral inhibitory and excitatory inputs may facilitate spatial pattern recognition in pattern-recognizing computational-node networks.

Figure 26B:
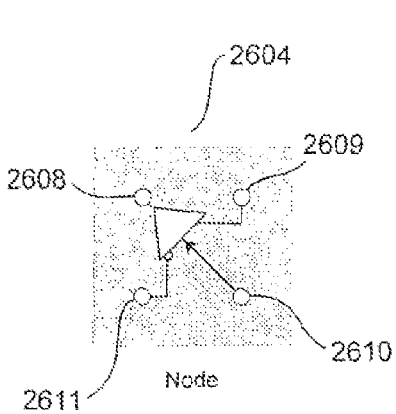
FIGS. 26A-C illustrate a hardware implementation of a multi-layer computational-node network, such as that shown in FIGS. 24-25, that represents an embodiment of the present invention.
Figure 26A:
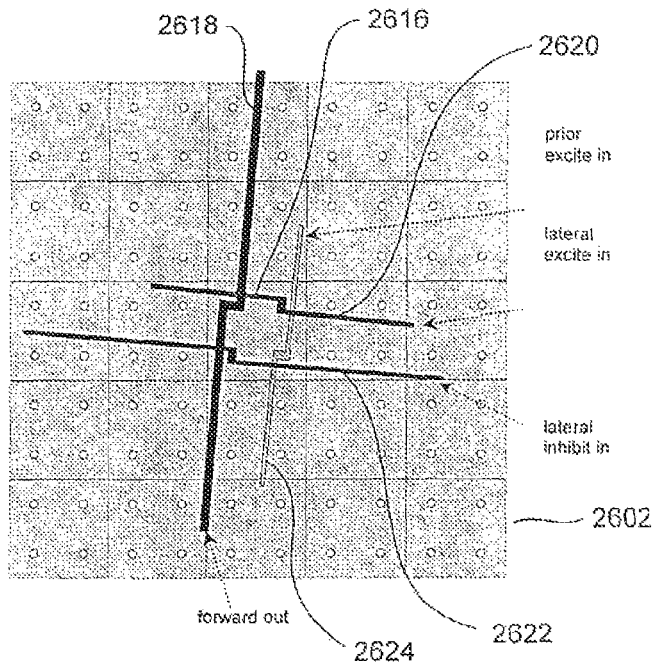
Figure 26C:
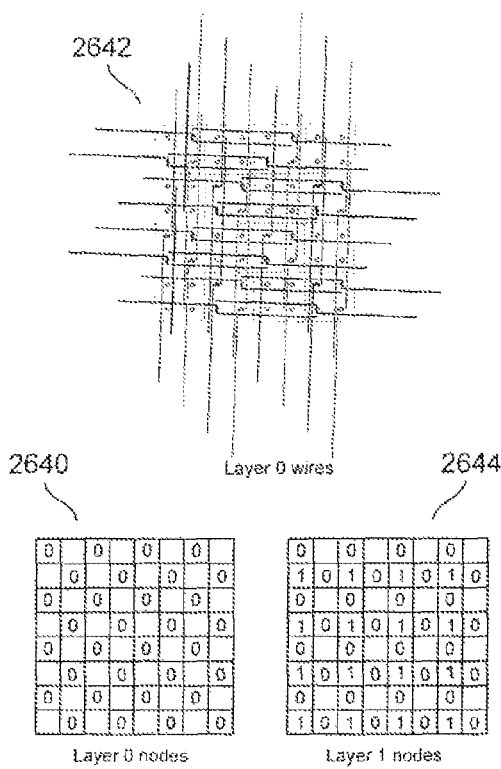

FIGS. 26A-C illustrate a hardware implementation of a multi-layer computational-node network, such as that shown in FIGS. 24-25, that represents an embodiment of the present invention. The nodes are fabricated by well-known integrated-circuit fabrication methods into a rectilinear array of silicon-based nodes 2602. As shown schematically in FIG. 26B, each node 2604 includes four input pins, or vias, 2608-2611. In the implementation shown in FIGS. 26A-C, all of the nodes of all of the node layers are fabricated in a single, two-dimensional array of nodes 2602, with the hierarchies constructed by nanowires and nanowire connections fabricated in layers above the silicon-based node layer. FIG. 26A shows four different types of nanowires connected to the four vias of one computational node 2616. One via, representing the output signal, is connected to a nanowire output signal line 2618. Two parallel nanowires 2620 and 2622 represent lateral excitatory and lateral inhibitory input signals, and are connected to vias 2609 and 2611, respectively. A final nanowire 2624 represents inputs from preceding node layers, and is connected to via 2610. The input from previous nodes 2624 is implemented in a first nanowire layer, the lateral input lines 2620 and 2622 are implemented in a second layer, and the output signal line 2618 is implemented in a third layer. Note that the output signal line is generally broader and thicker than the lateral signal lines and prior-node-level signal lines 2624. The output signal line is also generally longer, in order to provide connections to more widely separated nodes of a next layer. The three above-described layers together form a single node-connection layer corresponding to an intermediate-node layer within a hierarchically organized architecture, such as that shown in FIGS. 24-25.

As shown in FIG. 26C, successive node layers or levels can be implemented by successive nanowire-connection layers, each oriented at 90-degree angles with preceding and succeeding nanowire-connection layers. For example, the layer-0 nodes, or input nodes, may comprise a checkerboard pattern of layer-0 nodes 2640, each labeled with the symbol "0," with each layer-0 node connected to lateral input signal lines and an output signal line constructed in a first, two-internal-layer nanowire-connection layer 2642. Then, layer-1 nodes 2644 can be implemented from unoccupied node positions following selection of the layer-0 nodes, shown labeled in FIG. 26C with the symbol "1." These nodes are interconnected with one another, with layer-0 nodes below, and with layer-2 nodes above via prior input, lateral input, and output signal lines of a three-internal-layer nanowire-connection layer constructed above the first two-inner-layer nanowire-connection layer, and oriented approximately 90 degrees with the first two-inner-layer nanowire-connection layer. the nanowires 2648 connected to one level-1 node shown in FIG. 26C. Each successive layer of nodes is selected from unoccupied nodes remaining following selection of the lower-level nodes, with layer-2 nodes 2650 shown labeled with the symbol "2" and layer-3 nodes 2652 shown labeled with the symbol "3" in FIG. 26C. Each successive layer of nodes is interconnected laterally and with preceding nodes and next-layer nodes through an additional three-inner-layer nanowire layer constructed above the previously constructed nanowire layer. with a final output-node layer interconnected with a one-inner-layer or two-inner-layer nanowire-connection layer.

Figure 27:
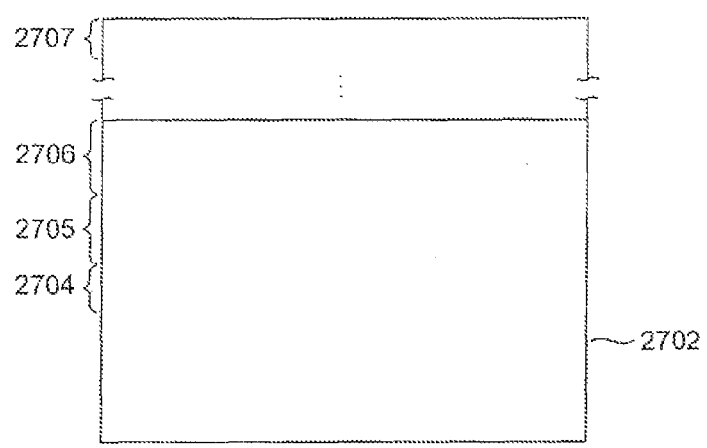
FIG. 27 shows an edge-on view of a portion of the computational-node network fabricated according to the architecture illustrated in FIGS. 26A-C, according to one embodiment of the present invention.

FIG. 27 shows an edge-on view of a portion of the computational-node network fabricated according to the architecture illustrated in FIGS. 26A-C, according to one embodiment of the present invention. The nodes are fabricated in an underlying, silicon-based layer 2702, and the hierarchical node layers implemented by successive nanowire-connection layers 2704-2707. The first nanowire-connection layer includes two inner layers, as discussed above, and the final nanowire-connection layer 2707 also includes two nanowire layers, omitting output signal lines, unneeded because no higher layer of nodes is implemented above the final nanowire layer of the illustrated device.

In addition, nodes need to be interconnected by global-clock signal lines, and input nodes and output nodes need to be connected with input signal lines and output signal lines that interconnect the computational-node network with additional components of a computing system or device. These global-clock-signal lines and input-signal lines and output signals lines may be implemented at the silicon-based node level using convention IC-fabrication techniques.

Figure 28:
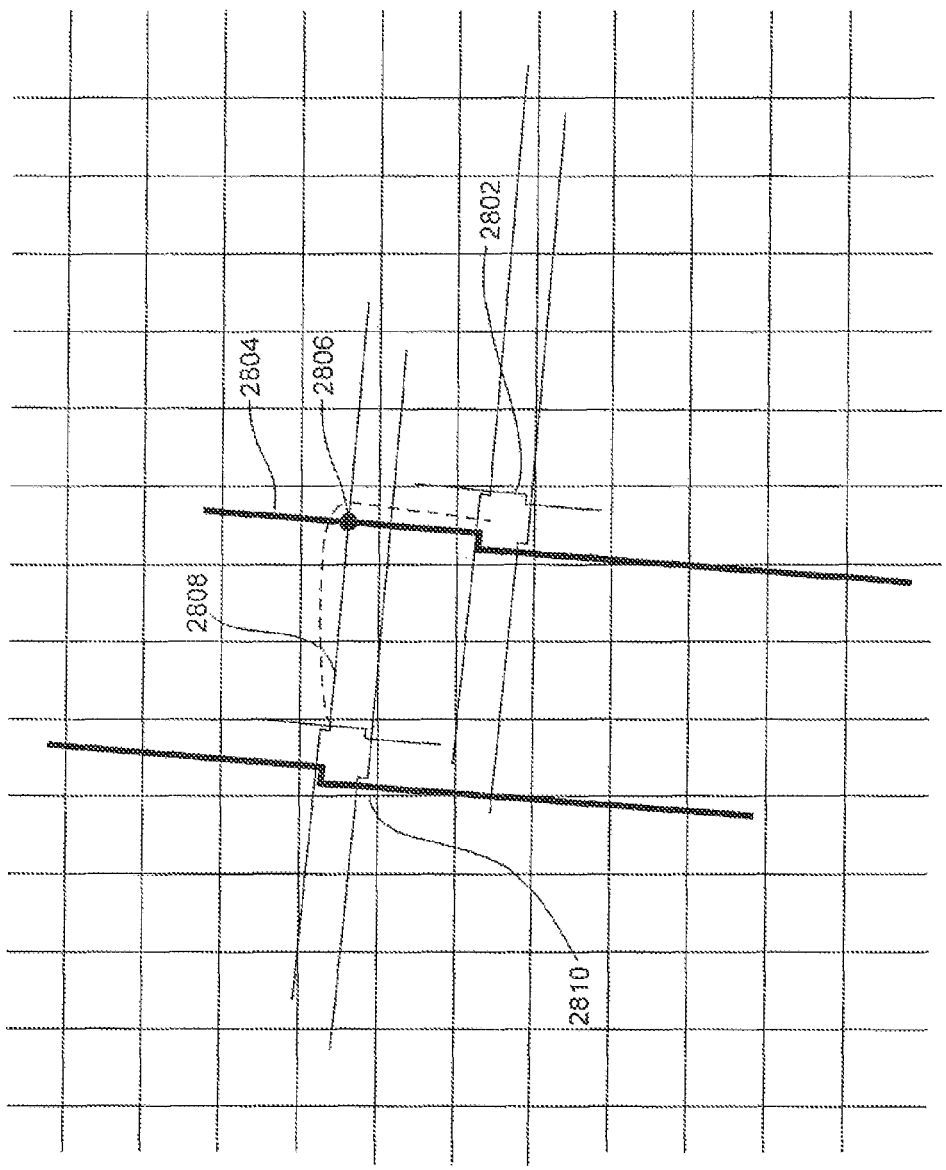
FIGS. 28-30 illustrate three different types of connections between nodes in a computational-node network that represents one embodiment of the present invention.
Figure 29:
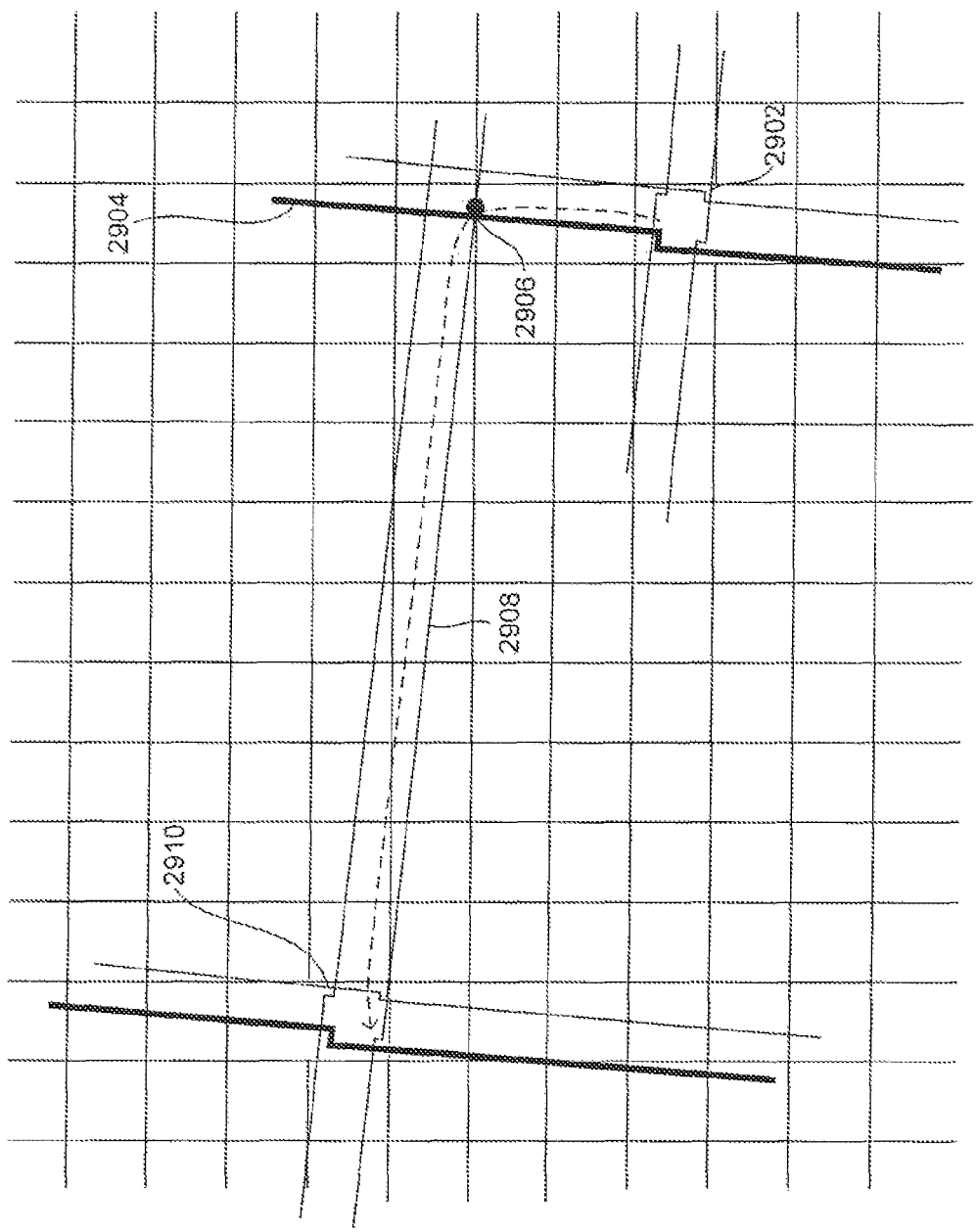
Figure 30:
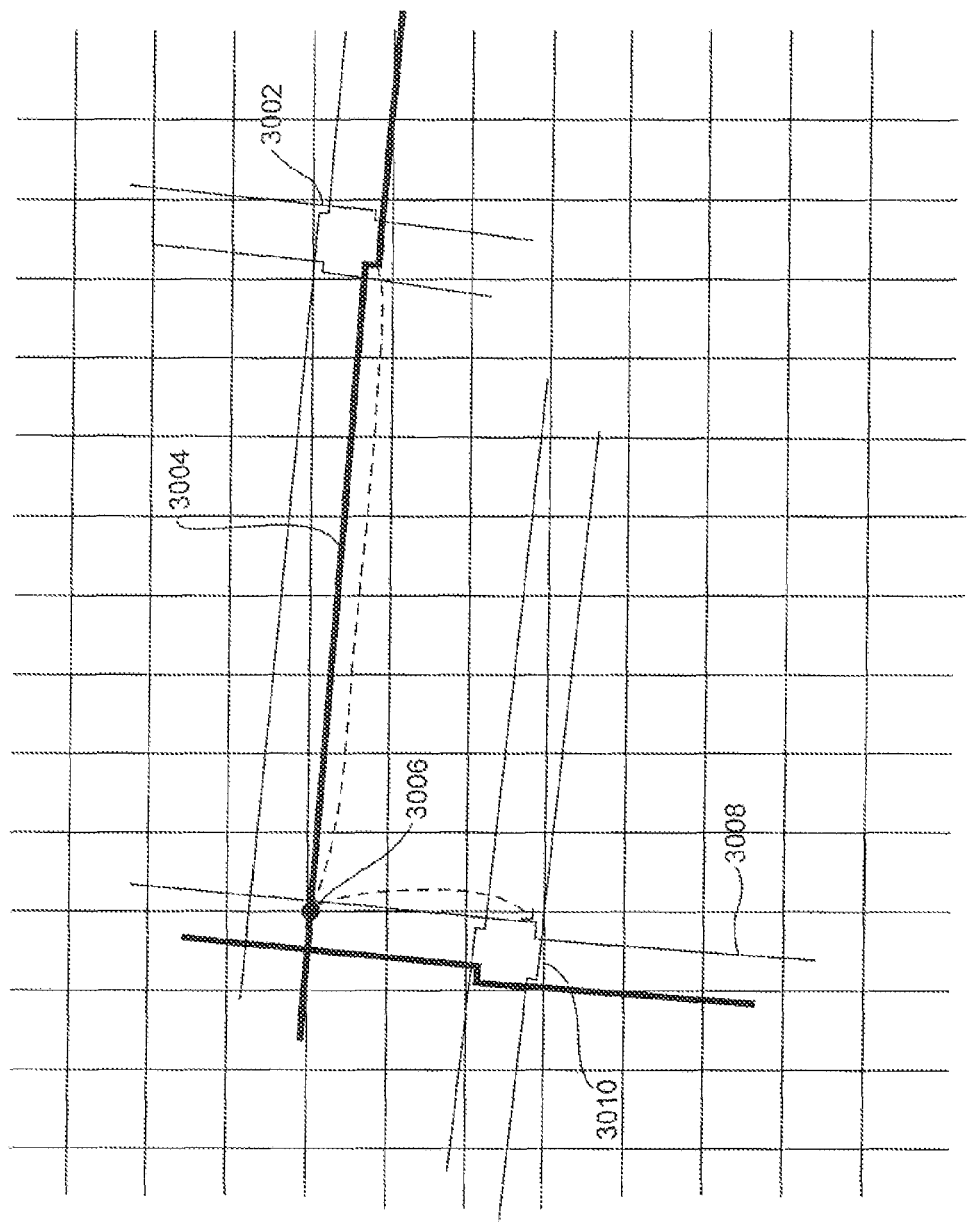

FIGS. 28-30 illustrate three different types of connections between nodes in a computational-node network that represents one embodiment of the present invention. FIG. 28 illustrates an excitatory, lateral interconnection between two nodes within a single node layer of a computational-node network that represents one embodiment of the present invention. The source node 2802 outputs signals on an output signal line 2804 that interconnects 2806, through a memristive nanowire junction, with the input excitatory signal line 2608 of a sink node 2810. FIG. 29 shows an inhibitory, lateral connection between two nodes within a single node layer of a computational-node network that represents one embodiment of the present invention. The source node 2902 outputs signals on an output signal line 2904 interconnected 2906 with the inhibitory signal line 2908 of the sink node 2910. FIG. 30 shows an interconnection between a source node in a first node layer and sink node in a higher, second node layer of a computational-node network that represents one embodiment of the present invention. The source node 3002 outputs signal lines on the output signal line 3004 interconnected 3006 with the prior-node-level input signal line 3008 of the sink node 3010. Using the three types of connections shown in FIGS. 28-30, all of the interconnections between nodes of the node layers in a computational-node architecture such as that shown in FIGS. 24-25 can be implemented in a series of two-inner-layer and three-inner-layer nanowire layers.

EXPERIMENTAL RESULTS

Figure 31:
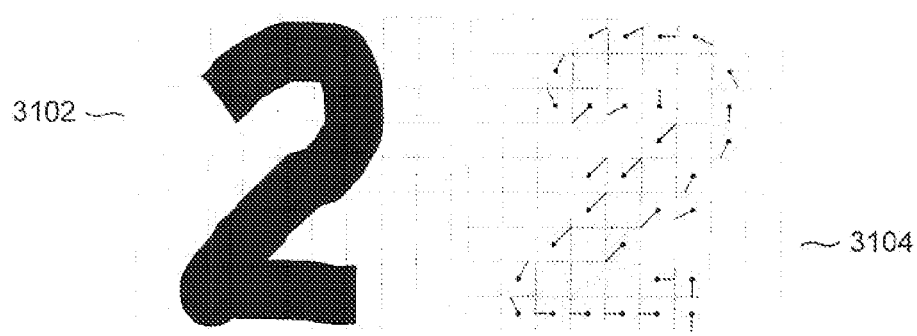
FIG. 31 illustrates desired output produced by a computational-node network for a problem domain.

To explore the sensitivity of a computational-node-network embodiment of the present invention to defects, device variation, noise, and so on, a classic problem in self-organized systems was simulated. The problem is directed to the self-organization of an array of spatial filters sensitive to edges at various orientations. Such an array might be used as the first stage of a visual pattern matching system, such as a character recognition system. FIG. 31 illustrates desired output produced by a computational-node network for this problem domain. The idea is to feed in a pixilated gray-scale image 3102, find the edges in it, and determine the angular orientation and magnitude of each edge segment across the image 3104. This is not a very exciting application, by itself, but has become a standard first problem in self-organizing systems-analogous to writing the "hello, world" program in a new programming language. It also makes a simple and convenient test bed for experimentation.

Figure 32:
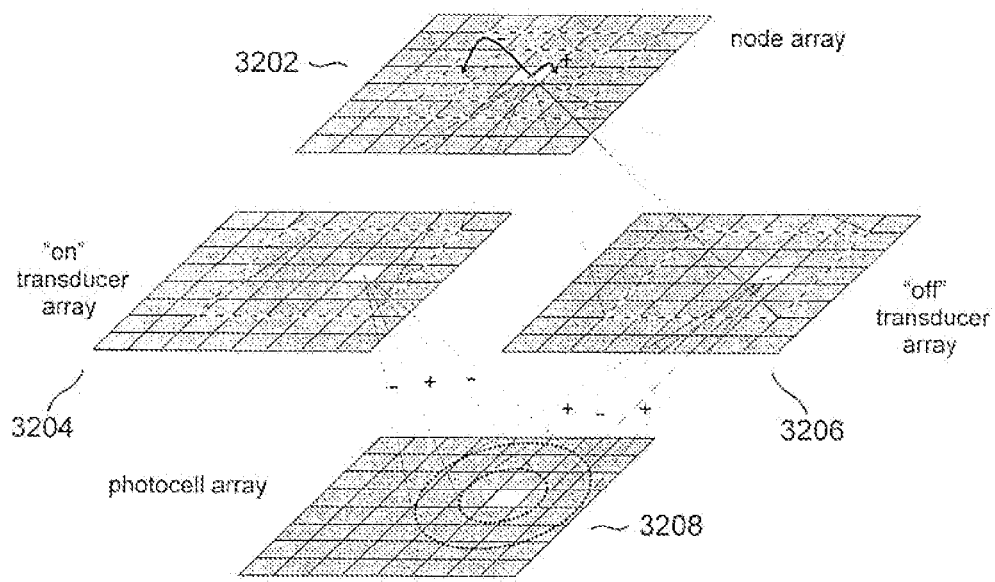
FIG. 32 shows an experimental computational-node network that represents an embodiment of the present invention.

FIG. 32 shows an experimental computational-node network that represents an embodiment of the present invention. The experimental network consists of a single layer of nodes 3202, with center-surround recurrences, driven by a pair of transducer arrays 3204 and 3206 that translate the pixels of an input image into sequences of spikes. The arrays 3204 and 3206 are shown separated in FIG. 32 for clarity; in an actual implementation, the photocell array 3208, transducer arrays, and node array would be interleaved. All arrays are of size 16×16 and have their edges wrapped around in a torus to minimize boundary effects-this is an experimental shortcut that compensates for the small number of nodes in the network.

The photocell array 3208 is used to present gray-scale images to the transducer arrays. Each pixel in that array takes on a value in the range −1 (white) to 1 (black). The two transducer arrays, called the "on" array 3204 and "off" array 3206, implement spatial bandpass filters. Each cell of these two arrays computes a weighted average of pixel intensities in small circular, center-surround neighborhoods of the photocell array directly beneath it. The "center" neighborhoods have a radius of 3, and the "surround" neighborhoods have a radius of 6; the computed average for each "on" cell is:

$$cell_{on} = \sum_{ij \in center} 0.034 \, pixel_{ij} + \sum_{ij \in surround} 0.012 \, pixel_{ij}$$

The coefficients above were chosen so that "center" coefficients summed to 1, and "surround" coefficients summed to −1. The average for an "off" cell is the negative of the corresponding "on" cell average. Negative averages are clipped at zero for both types of cells to determine their "activity." In each cycle, the "on" and "off" cells emit spikes to the nodes in the cell array. "On" cells spike most strongly when they see a black region in their center surround by white; "off" cells respond most strongly to white centers surrounded by black.

The node array has a square, center-surround recurrence structure. Each node receives edge inputs from a 7×7 square neighborhood of cells in the "on" and "off" arrays, centered on the cells directly beneath it. These two sets of edges (a total of 98) are collectively called the "receptive field" of the node. The node also excites its neighbors within a 3×3 square neighborhood, and inhibits neighbors within a 4×4 square neighborhood. Since lateral inhibitory inputs have only half the effect of excitatory lateral inputs, the net effect is excitation of the 8 closest neighbors, and inhibition of the ring of neighbors surrounding those. FIG. 33 shows a table containing default network parameters for an embodiment of the present invention.

The network was initialized by setting all edges to their maximum weight and all node integrators to zero. Random 16×16 input images were constructed by randomly assigning pixel values from a Gaussian distribution, and then smoothing the toroidal image by convolution with the kernel 18 exp(−d²)-18 exp(−d²/15²), where d is distance measured in units of pixels. The network was clocked for 5 000 000 cycles, with a new random image presented every 9 cycles.

To evaluate the network's ability to detect oriented edge, we constructed a set of 24 half-black/half-white, oriented edge images, $I^\theta$, with orientations, θ, uniformly distributed over (0, 2π). The pixels, $I_{ij}^\theta$, in each image were either white (−1), black (+1), or appropriately interpolated if they intersected the oriented edge.

Response, R, of a node to the image $I^\theta$ used the weights of the forward edges within that node's receptive field:

$$R(\theta) = \sum_i \sum_j w_{ij}^{on}[I_{ij}^\theta]_+ + \sum_i \sum_j w_{ij}^{off}[-I_{ij}^\theta]_+$$

where the operator [.]₊ is equal to its argument for positive values and zero for negative values. This is not, strictly speaking, an accurate measure of a node's response to the image, but is an approximation that's commonly used.

The components:

$$a = \sum_k R(\theta_k)\cos\theta_k$$

$$b = \sum_k R(\theta_k)\sin\theta_k$$

were then calculated. Then the preferred orientation, φ, for a node can then be calculated as φ=arc tan(b/a) if a≧0, or φ=π+arc tan(b/a) if a<0 and orientation selectivity, S, as $$S = \frac{1}{24}(a^2 + b^2)^{\frac{1}{2}}$$

Figure 34:
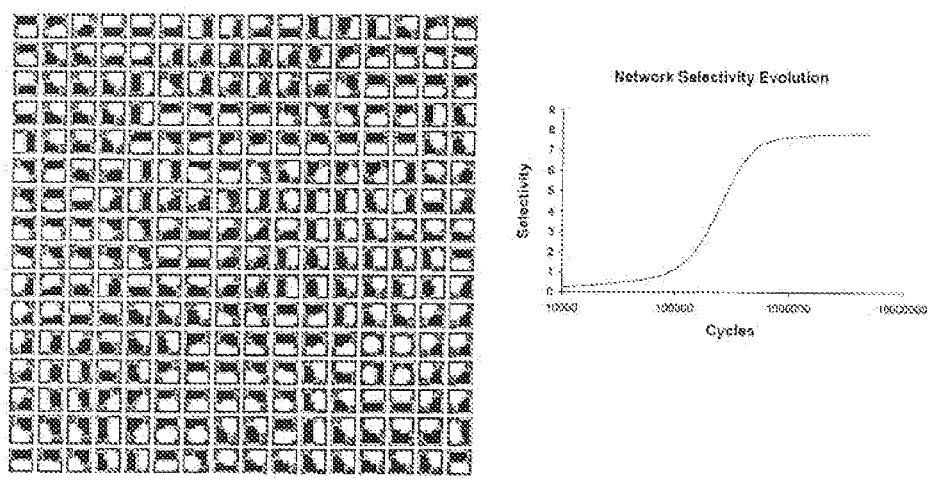
FIG. 34 shows the receptive fields of a defect-free and device-invariant network clocked for 5 000 000 cycles, that represents one embodiment of the present invention.

Network selectivity was then calculated as the average orientation selectivity for all nodes in the network. 6.4 Results FIG. 34 shows the receptive fields of a defect-free and device-invariant network clocked for 5 000 000 cycles, that represents one embodiment of the present invention. To visualize the receptive fields of each node, we consider the weights of the receptive field edges, w ij on and wij off, and compute a pixel for each pair of edges as $pixel_{ij} = w_{ij}^{on} - w_{ij}^{off}$ In all receptive field images we then show $pixel_{ij}$ mapped on a continuous grayscale spanning −1 (white), 0 (gray), and 1 (black).

Figure 35:
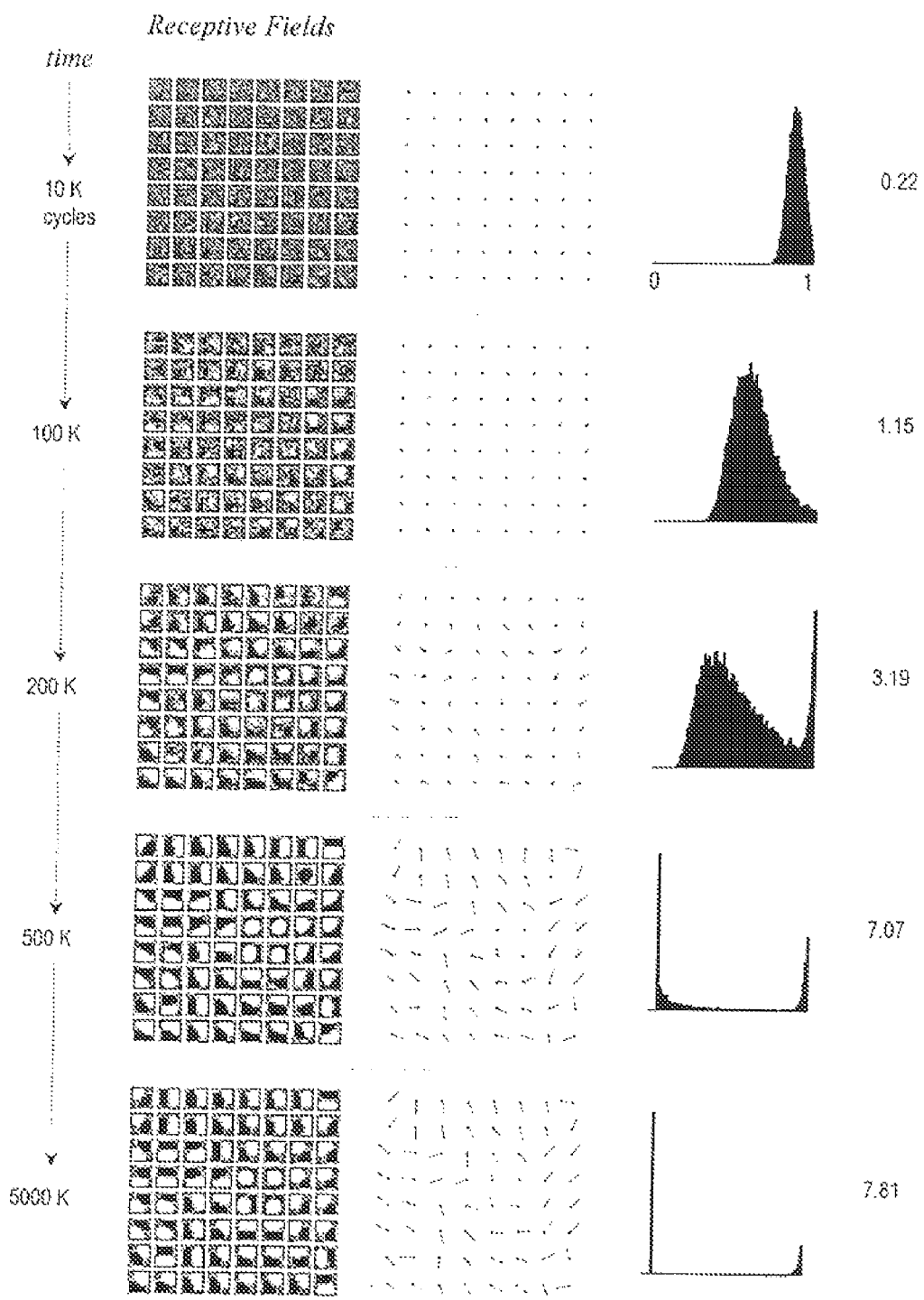
FIG. 35 shows the evolution of the lower, right quadrant of the network shown in FIG. 32 according to one embodiment of the present invention.
Figure 36:
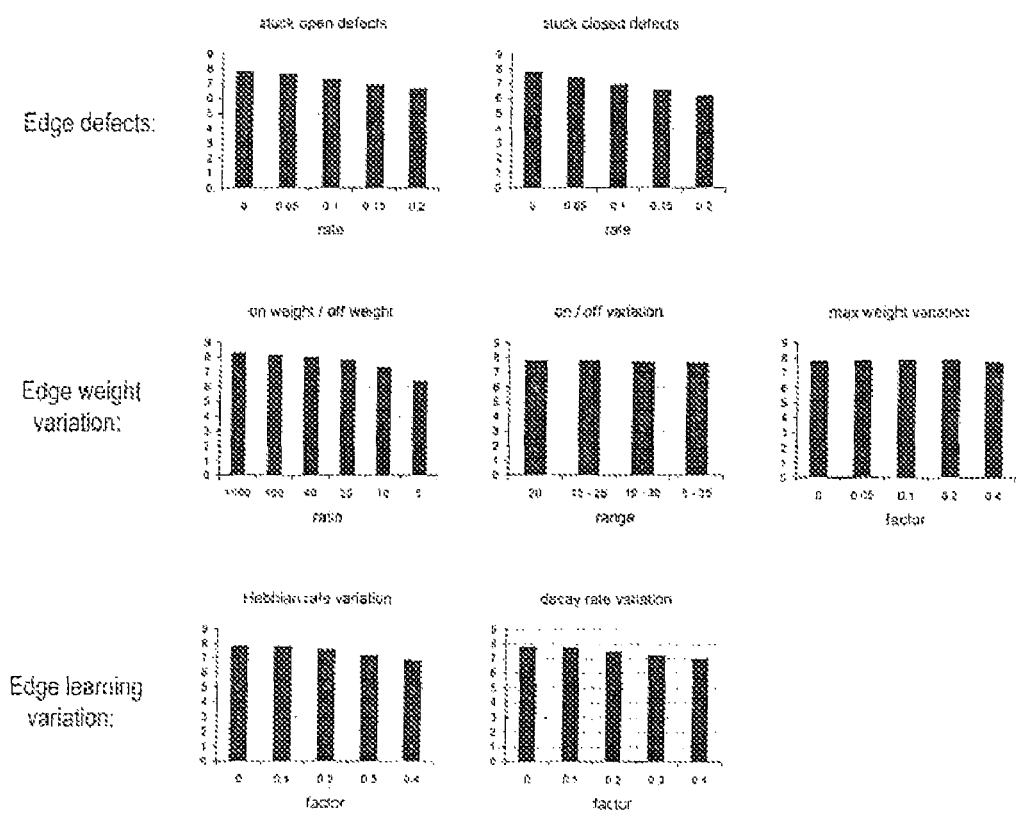
FIG. 36 shows the results of experiments in network sensitivity to defects and device variation according to one embodiment of the present invention.

FIG. 35 shows the evolution of the lower, right quadrant of the network shown in FIG. 32 according to one embodiment of the present invention. Here we can see the emergence of edge orientation filters, and the tendency of the network to drive the edge weights into a strongly bimodal distribution. FIG. 36 shows the results of experiments in network sensitivity to defects and device variation according to one embodiment of the present invention.

The first set of experiments addressed edge defects. A "stuck open" edge had a fixed weight of 0; a "stuck closed" edge had a fixed weight of $w_{max}$. In these experiments, edges were randomly selected to be stuck open (or stuck closed) with different probabilities (0, 0.05, 0.1, . . . ). As can be seen from the bar graphs, network selectivity degrades gently as defect rates increase, with a greater sensitivity to stuck closed defects.

The second set of experiments explored sensitivity to edge weight variation. The first experiment fixed $w_{max}$ at 1.0 and varied $w_{min}$ to achieve "on/off" ratios ($w_{max}/w_{min}$) varying from 5 to 1000. Although larger ratios yield higher network selectivities, the results show rapidly diminishing returns for ratios larger than about 20, and suggest it might be possible to build functional networks even with low ratio devices. The second experiment studied the impact of on/off ratio variation, with ratios uniformly distributed over different ranges (e.g. 5 to 20). The network was surprisingly insensitive to this variation. In the final experiment of the set, edges were assigned values for $w_{max}$ uniformly distributed in the interval (1−factor, 1+factor). Again, the network was quite insensitive to variation.

The last set of experiments explored sensitivity to variations in device learning rates. The "Hebbian" experiments randomly varied the correlational learning coefficient from Table 1, $\Delta w(f-b+)$, uniformly over the range 1.5 R (1−factor, 1+factor). The "decay" experiments varied the "pulse" coefficient, $\Delta w(f+)$, similarly. (The remaining coefficients, $\Delta w(f-)$, $\Delta w(b+)$ and $\Delta w(b-)$, maintained the ratios to $\Delta w(f+)$ shown in Table 1 for each device.) Increasing learning rate variations gently degraded network performance.

Although the present invention has been described in terms of particular embodiments, it is not intended that the invention be limited to these embodiments. Modifications within the spirit of the invention will be apparent to those skilled in the art. For example, any number of different hardware implementations of computational nodes that provide behavior equivalent to, or similar to, the node models described with reference to FIGS. 13-15, can be implemented using different circuit layers, layouts, and components. As discussed above, memristive nanowire junctions having various different properties and conductance/voltage curves may be fabricated from any number of different types of materials. The computational nodes that represent embodiments of the present invention may be fabricated in single, silicon-based layers, or multiple silicon-based layers interconnected by currently available interconnection technologies. Nodes with different numbers of inputs and outputs may be implemented, in alternative embodiments, in order to accommodate any of an almost limitless number of different connection topologies in order to implement computational-node networks representing arbitrary non-linear functions with essentially arbitrary dimensionality. Many alternative embodiments of node implementations, such as the node implementation shown in FIG. 20, are possible, including different components that implement the signal summing, integration, thresholding, and generation functions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computational node comprising:
input signal lines connected through memristive, nanowire-junctions to one or more input-providing computational nodes;
an output signal line connected through memristive, nanowire-junctions to one or more output-receiving computational nodes;
a leaky integrator that integrates input signals received through the input signal lines and the output signal line;
a thresholder that compares leaky-integrator output to a threshold value;
a clock input; and
a state machine that, based on received thresholder output and clock input, directs state transitions and that generates computation-node spike signals, wherein spike signals include forward spikes output on the output signal line and backward spikes output on the input signal lines.

2. The computational node of claim 1 wherein the conductance of memristive, nanowire-junctions that connect input signal lines and the output signal line to input-providing and output-receiving nodes, respectively, represent edge weights of a computational-node network that includes the computational node.

3. The computational node of claim 1 wherein forward spikes each comprises approximately-equal-magnitude but opposite-polarity voltage pulses over approximately equal time intervals, one in a first phase, the other in a second phase of a three-phase cycle.

4. The computational node of claim 1 wherein backward spikes each comprises approximately-equal-magnitude but opposite-polarity voltage pulses over non-equal time intervals, one in a second phase, the other in a third phase of a three-phase cycle.

5. The computational node of claim 1 wherein state transitions include transitions between four states comprising:
a quiescent processing mode;
an active processing mode;
a quiescent pre-spiking mode; and
a spiking mode.

6. The computational node of claim 5 wherein the node enters the quiescent-processing-mode state upon power-on, from the active-processing-mode state when thresholder output indicates that integrated input signals are below the threshold value, and from the spiking-mode state following generation of a spike signal.

7. The computational node of claim 6 wherein, in the quiescent-processing-mode state, the computational node integrates received signals from input-providing and output-receiving nodes.

8. The computational node of claim 6 wherein, in the spiking-mode state, the computational node generates a spike signal, sets the leaky-integrator output to the negative of the threshold value, and transitions back to the quiescent-processing-mode state.

9. The computational node of claim 5 wherein the node enters the active-processing-mode state, upon receiving a global-clock tick, from the quiescent-processing-mode state.

10. The computational node of claim 9 wherein, in the active-processing-mode state, the computational node decides, based on output from the thresholder, whether to transition back to the quiescent-processing-mode state, when the thresholder output indicates that integrated input signals are below the threshold value, or to transition to the quiescent-pre-spiking-mode state.

11. The computational node of claim 5 wherein the node enters the quiescent-pre-spiking-mode state from the active-processing-mode state when thresholder output indicates that integrated input signals are greater-than-or-equal-to the threshold value.

12. The computational node of claim 11 wherein, in the quiescent-pre-spiking-mode state, the computational node prepares to generate a spike signal.

13. The computational node of claim 5 wherein the node enters the spiking-mode state from the quiescent-pre-spiking-mode state following reception of a next global-clock signal by the node.

14. A computational-node network implemented from computational nodes of claim 1, the computational-node network comprising:
   input signal lines;
   one or more output signal lines; and
   one or more computational-node layers, each layer comprising a number of computational nodes.

15. The computational-node network of claim 14 wherein an intermediate-level node is connected to lower-level nodes through memristive nanowire junctions connecting a prior-node-input signal line to lower-level-node output signal lines, the prior-node-input signal line connected to a first via of the intermediate-level node.

16. The computational-node network of claim 14 wherein an intermediate-level node is connected to a same-level node that transmits inhibitory signals through a memristive nanowire junction connecting an inhibitory-input signal line to the same-level-node output signal line, the inhibitory-input signal line connected to a second via of the intermediate-level node.

17. The computational-node network of claim 14 wherein an intermediate-level node is connected to a same-level node that transmits excitatory signals through a memristive nanowire junction connecting an excitatory-input signal line to the same-level-node output signal line, the excitatory-input signal line connected to a third via of the intermediate-level node.

18. The computational-node network of claim 14 wherein an intermediate-level node is connected to a next-level node through a memristive nanowire junction connecting the intermediate-level node's output signal line to a next-level-node's prior-node-input signal line, the output signal line connected to a fourth via of the intermediate-level node.

19. The computational-node network of claim 14 wherein computational nodes are implemented in a single silicon-based layer and hierarchically interconnected by a number of nanowire-connection layers equal to the number of node layers.

* * * * *